(12) United States Patent
Turnbull et al.

(10) Patent No.: US 7,817,020 B2
(45) Date of Patent: Oct. 19, 2010

(54) OPTICAL USER INTERFACE SYSTEM FOR AUTOMOTIVE MODULES

(75) Inventors: Robert R. Turnbull, Holland, MI (US); David A. Blaker, Holland, MI (US); Michael A. Bryson, Hudsonville, MI (US); David L. Plangger, Holland, MI (US); G. Bruce Poe, Hamilton, MI (US); Alan R. Watson, Buchanan, MI (US)

(73) Assignee: Gentex Corporation, Zeeland, MI (US)

( * ) Notice: Subject to any disclaimer, the term of this patent is extended or adjusted under 35 U.S.C. 154(b) by 1037 days.

(21) Appl. No.: 11/550,225

(22) Filed: Oct. 17, 2006

(65) Prior Publication Data

US 2008/0087797 A1 Apr. 17, 2008

(51) Int. Cl.
*B60Q 1/00* (2006.01)

(52) U.S. Cl. .................. 340/438; 340/540; 340/686.1; 362/276; 362/286; 359/267; 359/265; 359/275; 359/838; 359/839

(58) Field of Classification Search .............. 340/815.4, 340/438, 602, 375, 686.1; 348/148; 359/267, 359/265, 275, 838, 839, 841, 872; 362/494, 362/545, 460; 250/208.1, 214
See application file for complete search history.

(56) References Cited

U.S. PATENT DOCUMENTS

| | | | |
|---|---|---|---|
| 4,735,274 | A | 4/1988 | Good et al. |
| 6,419,379 | B1 | 7/2002 | Hulse |
| 6,445,988 | B1 | 9/2002 | Breed et al. |
| 6,614,579 | B2 * | 9/2003 | Roberts et al. ............. 359/267 |
| 6,700,692 | B2 | 3/2004 | Tonar et al. |
| 6,927,384 | B2 * | 8/2005 | Reime et al. ................ 250/221 |
| 6,980,092 | B2 | 12/2005 | Turnbull et al. |
| 7,084,859 | B1 * | 8/2006 | Pryor .......................... 345/173 |
| 7,342,485 | B2 * | 3/2008 | Joehl et al. ................... 340/438 |
| 2002/0008718 | A1 * | 1/2002 | Obradovich ................ 345/764 |
| 2002/0024713 | A1 * | 2/2002 | Roberts et al. .............. 359/267 |
| 2002/0067615 | A1 | 6/2002 | Muller |
| 2003/0081935 | A1 * | 5/2003 | Kirmuss ....................... 386/46 |
| 2004/0217267 | A1 * | 11/2004 | Reime ......................... 250/221 |
| 2004/0246607 | A1 | 12/2004 | Watson et al. |
| 2005/0168449 | A1 * | 8/2005 | Katayose ..................... 345/173 |
| 2005/0270620 | A1 | 12/2005 | Bauer et al. |
| 2005/0273212 | A1 | 12/2005 | Hougen |
| 2005/0276448 | A1 * | 12/2005 | Pryor .......................... 382/103 |

(Continued)

OTHER PUBLICATIONS

Mechaless Optoelectronic Systems, "Evaluation Board 'Optical Multi-Input Device' (IC 909.02)," Oct. 5, 2006 (2 pages).

(Continued)

*Primary Examiner*—George A Bugg
*Assistant Examiner*—Hoi C Lau
(74) *Attorney, Agent, or Firm*—Price, Heneveld, Cooper, DeWitt & Litton, LLP

(57) ABSTRACT

A rearview assembly for a vehicle including a mounting structure for mounting to a vehicle, a rearward viewing device, and housing with a position sensor, is provided. The position sensor includes first and second radiation emitters, a radiation reception element, and sensor processing circuitry coupled to one of the position sensors and the radiation reception element. The position sensor determines the position of an object in the vicinity of the rearward viewing device.

50 Claims, 12 Drawing Sheets

U.S. PATENT DOCUMENTS

| | | | |
|---|---|---|---|
| 2006/0044800 A1* | 3/2006 | Reime | 362/276 |
| 2006/0158757 A1 | 7/2006 | Wang et al. | |
| 2006/0164619 A1 | 7/2006 | Back et al. | |
| 2006/0193061 A1 | 8/2006 | Yoshitsugu | |
| 2007/0054651 A1* | 3/2007 | Farmer et al. | 455/352 |
| 2009/0251439 A1* | 10/2009 | Westerman et al. | 345/175 |

OTHER PUBLICATIONS

Elmos Semiconductor AG, "Designing Systems With Halios® Switch E909.01," 2006 (39 pages).

Vishay Semiconductors, "Reflective Sensor for Touchless Switch," Nov. 2, 2004 (8 pages), www.vishay.com.

Elmos Semiconductors AG, "Optical sensor with high ambient light immunity," Sep. 29, 2004 (49 pages).

Elmos Semiconductors AG, "Optical sensor with high ambient light immunity," Feb. 24, 2004 (29 pages).

Mechaless Optoelectronic Systems, "How does HALIOS® work?" (2 pages).

Rottman, F. and Spiegel, E., "Electronic Concept fulfils optical sensor dream," (8 pages).

* cited by examiner

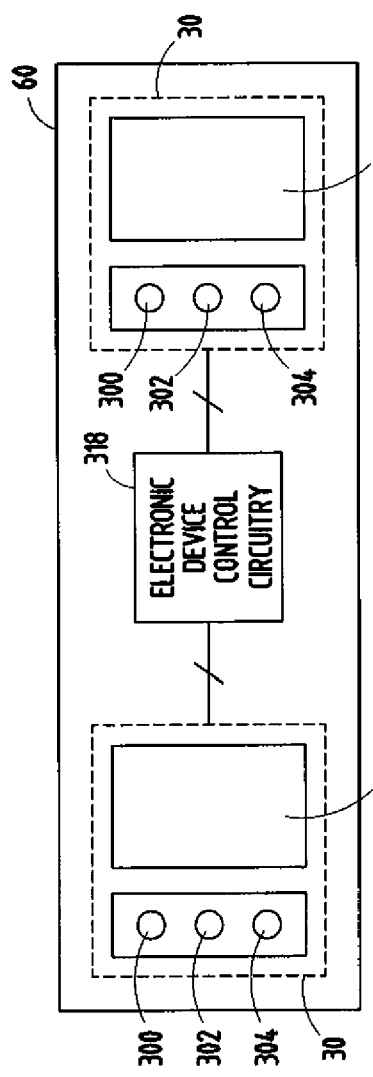
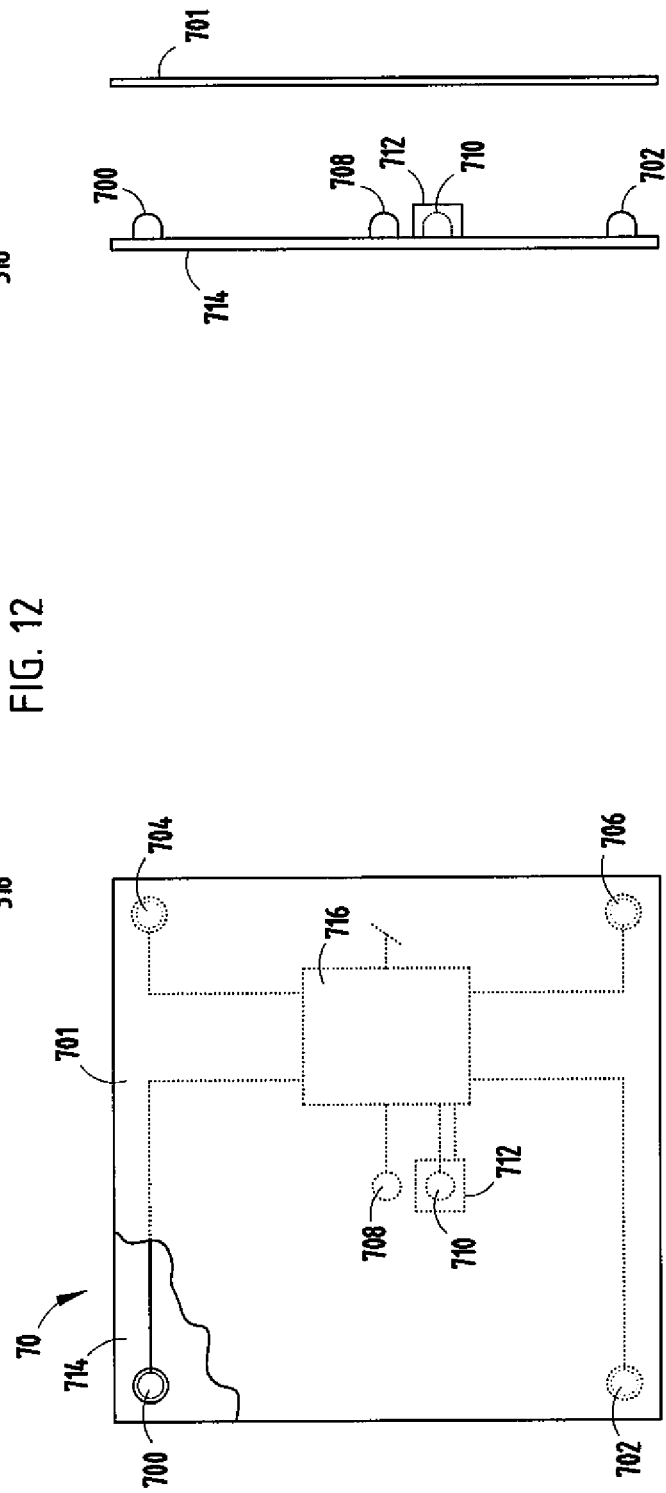
FIG. 12
FIG. 13
FIG. 14

OPTICAL USER INTERFACE SYSTEM FOR AUTOMOTIVE MODULES

BACKGROUND OF THE INVENTION

The present invention generally relates to optical user interfaces for controlling electronic devices, and more particularly to optical user interfaces for controlling electronic devices coupled to an automobile.

Preexisting electronics devices and accessories, specifically those located in a vehicle, typically utilize manual switches that require manual contact for the electronic device or accessory to be controlled. The requirement for manual contact presents several drawbacks. First, manual contact requires that an operator know and/or see the switch location precisely. This may be difficult at best during nighttime conditions or when the buttons are not easily seen by the operator. This can frequently happen in an automobile, where switches may be relatively small to accommodate multiple functions, and where the switch location is such that the driver must divert his or her eyes from the road ahead. When the device or accessory to be activated is an illuminator, such as a lamp, it may generally be assumed that the illuminator is only being activated because of the low light conditions that are present. Thus, switches for illuminators are inherently difficult to locate and activate.

Another problem associated with manual switches is the significant increased probability of static discharge into the electronic circuit to which the switch is connected. Another problem with switches requiring manual contact is that they accumulate debris and can transmit germs from one operator to another. The accumulated debris may also come between the electrical contacts and thus affect the reliability of the switch.

Switches that require mechanical movement and contact, which include electromechanical switches, membrane switches, etc., are prone to wear and are often the most unreliable portion of an electronic system. Also, many switch types do not function very well in a high moisture environment or in the presence of frost, as would occur in many vehicles. An additional problem with such switches is that most of the switch types are costly to make and difficult and costly to assemble into conventional circuit assemblies compared to the cost of incorporating other standard electronic components. Further, manual switches require an ordinate focus/concentration, distracting operators from safely executing their primary task. Commonly assigned U.S. Pat. No. 6,614,579 provides several examples of switches that enable an operator to activate electronic components by waving his or her hand or an object in the proximity of the device.

Locating manual switches in vehicles to control vehicle electronic devices or accessories can also be problematic for a number of reasons. Button space in or near the electronic devices can be limited. Switch backlights to assist the occupants in locating the manual switches are often necessary, but can be distracting to vehicle occupants and the driver. More complex vehicle electronic systems, such as telematics systems, often require sophisticated input means such as, for example, pointing devices, which can be difficult to implement in a mechanical or manual switch. As additional electronic features are added to vehicle rearview mirrors, additional inputs are often required without any additional area on the mirror being available for the placement of those input devices.

SUMMARY OF THE INVENTION

The present invention overcomes these problems by enabling an operator to control an electronic device, such as a lamp, audio system, mirror, camera, or other electronic device providing for user input, by placing a hand in the vicinity of the device or device input. The invention further provides for the utilization of existing structures, such as a rearview assembly in a vehicle, for the location of the user interface system, minimizing or eliminating the need to provide new surface area for the user interface portion of the system. The present invention still further provides for design flexibility, enabling the implementation of complex and sophisticated input devices without the need for complicated mechanical interfaces. The present invention is particularly well suited for use in a rearview assembly in a vehicle.

According to one embodiment of the present invention, a rearview assembly for a vehicle is provided. The rearview assembly includes a mounting structure for mounting to a vehicle, and a rearward viewing device. The rearview assembly also includes a housing with a position sensor. The position sensor includes first and second radiation emitters, a radiation reception element, and sensor processing circuitry coupled to one of the radiation emitters and the radiation reception element. The position sensor determines at least one of the distance of an object from the rearward viewing device and the position of an object on the surface of the rearward viewing device.

According to another embodiment of the present invention, a cup holder assembly for a vehicle is provided. The cup holder assembly includes a cup holder configured to be mounted to a vehicle and receive a cup. The cup holder assembly includes a position sensor located near the cup holder. The position sensor includes first and second radiation emitters, a radiation reception element, and sensor processing circuitry coupled to one of the radiation emitters and the radiation reception element. The position sensor determines the distance of an object from the position sensor.

According to yet another embodiment of the present invention, a door handle assembly for a vehicle is provided. The door handle assembly includes a door handle housing for housing a door handle, a door handle, and a position sensor located near the door handle housing. The position sensor includes first and second radiation emitters, a radiation reception element, and sensor processing circuitry coupled to one of the radiation emitters and the radiation reception element. The position sensor determines the distance of an object from the position sensor.

According to still another embodiment of the present invention, a parking assist sensor for a vehicle is provided. The parking assist sensor includes a sensor mounting structure on the surface of a vehicle, a sensor indicator in the vehicle passenger compartment, and a position sensor attached to the mounting structure. The position sensor includes first and second radiation emitters, a radiation reception element, and sensor processing circuitry coupled to one of the radiation emitters and the radiation reception element. The position sensor determines the distance of an object from the position sensor and provides that information to the sensor indicator.

According to yet another embodiment of the present invention, a position sensing assembly for a vehicle is provided. The position sensing assembly includes a housing attached to a vehicle and containing a position sensor. The housing has a surface configured to emit radiation from the position sensor. The position sensor includes first and second radiation emitters, a radiation reception element, and sensor processing circuitry coupled to one of the radiation emitters and the radiation reception element. The position sensor determines at least one of the distance of an object from the position sensor and the position of an object on the surface of the housing.

These and other features, advantages, and objects of the present invention will be further understood and appreciated by those skilled in the art by reference to the following specification, claims and appended drawings.

BRIEF DESCRIPTION OF THE DRAWINGS

FIG. 12 is a block diagram generally illustrating an optical position sensor employed in the rearview assembly of FIG. 11, according to one embodiment of the present invention;

FIG. 13 is a front view generally illustrating an optical position sensor employed in the rearview assembly of FIG. 11, according to one embodiment of the present invention;

FIG. 14 is a side view generally illustrating the optical position sensor of FIG. 13;

DETAILED DESCRIPTION OF PREFERRED EMBODIMENTS

Figure 1:
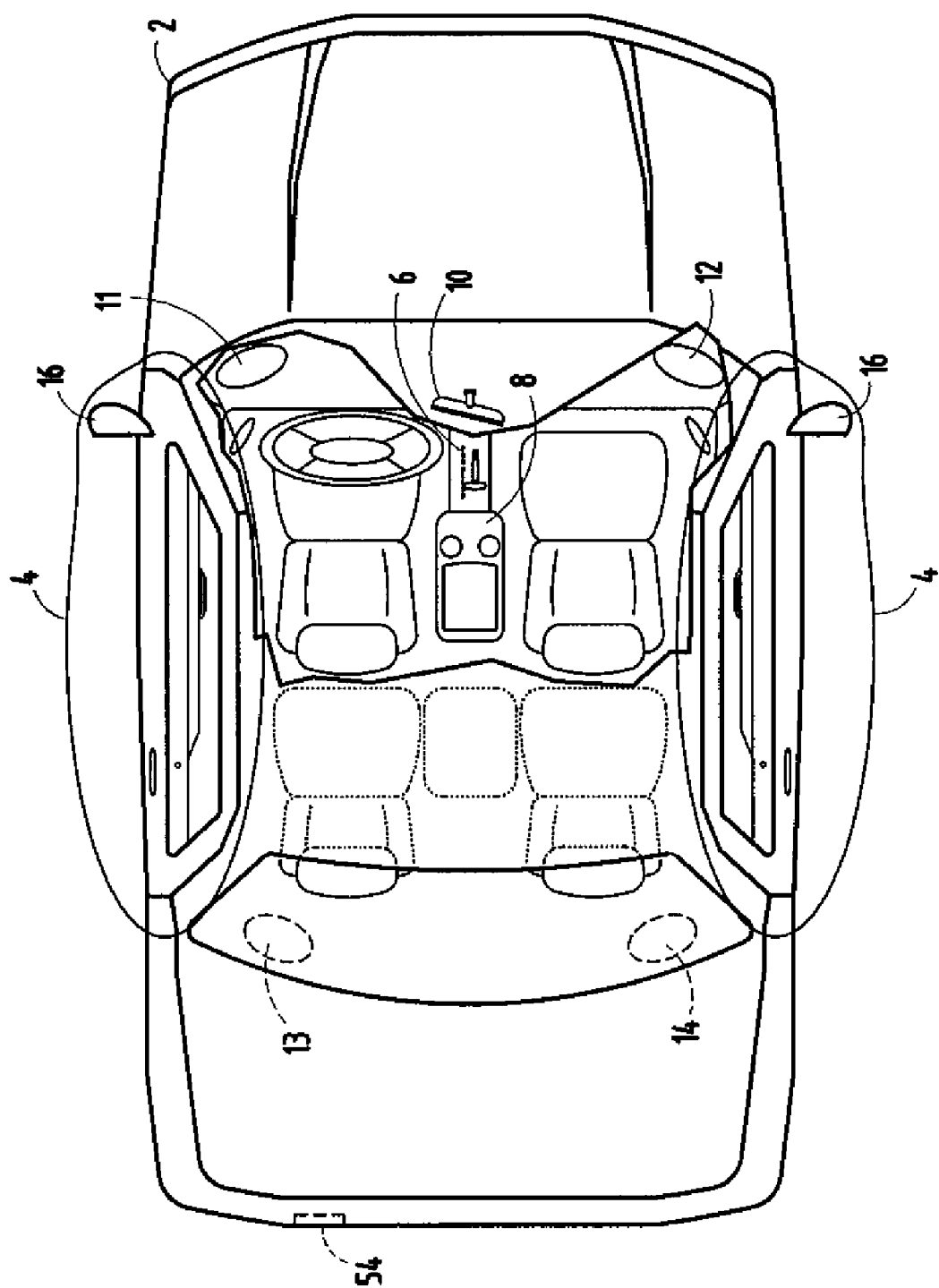
FIG. 1 is a top-down view generally illustrating a vehicle incorporating multiple optical position sensors according to various embodiments of the present invention.

Reference will now be made, in detail, to the preferred embodiments of the invention, examples of which are illustrated in the accompanying drawings. Whenever possible, the same reference numerals will be used throughout the drawings to refer to the same or like parts.

The present invention and its various aspects are generally described as being implemented in a vehicle. FIG. 1 provides a general illustration of a vehicle 2, incorporating various embodiments of the present invention. As shown, vehicle 2 includes vehicle doors 4 for ingress and egress into the vehicle. Each of vehicle doors 4 includes an external rearview mirror 16 for providing a view to the rear of the vehicle. Vehicle 2 also includes transmission control 6 for allowing a driver of the vehicle to control the transmission of the vehicle 2. As shown, vehicle 2 also includes floor console 8, which provides multiple areas for retaining cups in an upright position, and also includes armrest areas for the driver and front seat passenger. Vehicle 2 also includes a rearview assembly 10 for providing vehicle drivers and/or occupants with a view to the rear of the vehicle. Vehicle 2 also includes left front audio speaker 11, right front audio speaker 12, left rear audio speaker 13, and right rear audio speaker 14 for reproducing audio signals for the vehicle driver and/or passengers.

Figure 2:
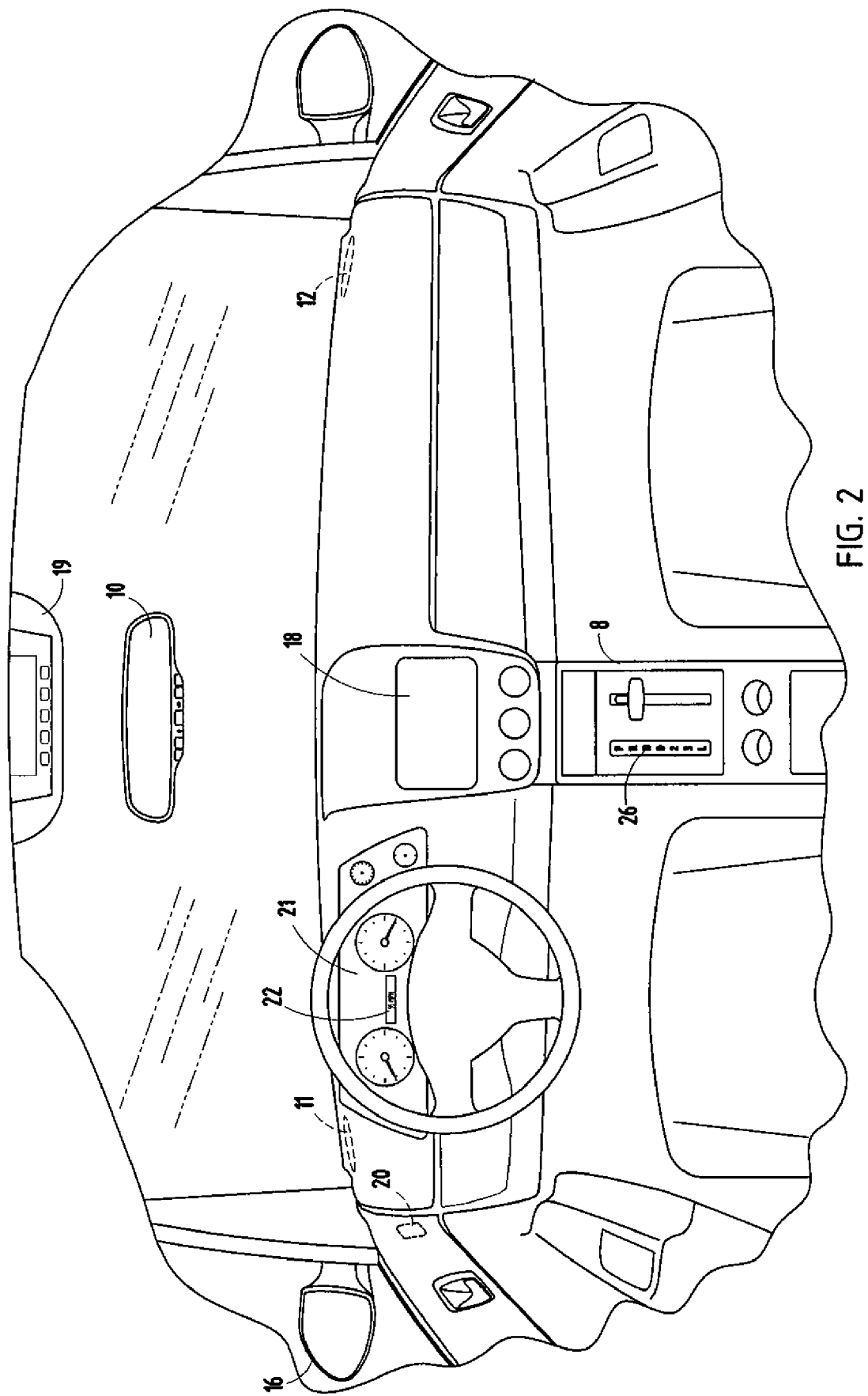
FIG. 2 is a cockpit view of the vehicle of FIG. 1.

FIG. 2 provides a cockpit view of the vehicle of FIG. 1. As shown, vehicle 2 also includes audio console 18, configured to allow drivers and/or passengers of vehicle 2 to control the vehicle audio system, and an instrument panel 21 configured to provide vehicle information to vehicle occupants. Vehicle 2 also includes an overhead console 19, configured to provide storage and house electronic components, such as, for example, lights, light switches, and garage door opener circuitry. Vehicle 2 still further includes external rearview mirror control 20 for allowing the driver of vehicle 2 to adjust the viewing area of external rearview mirrors 16. As shown, external rearview mirror control 20 is located on a vehicle door of the vehicle 2. In an alternate embodiment, external rearview mirror control 20 is located on a surface of the dashboard of vehicle 2, floor console 8, or an alternate location in vehicle 2. Vehicle 2 is also shown including transmission position indicators 22 and 26, also referred to as PRNDLs, for indicating a position of the vehicle transmission selected by the vehicle driver. As shown, transmission position indicator 22 is located in instrument panel 21, and transmission position indicator 26 is located in floor console 8.

Figure 3:
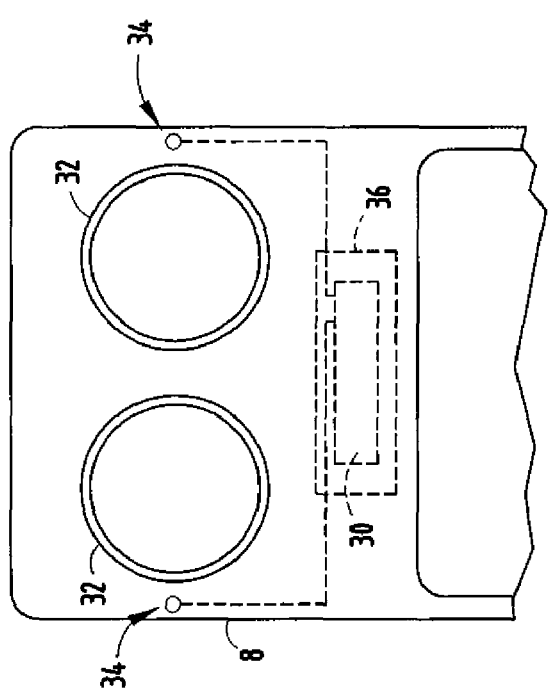
FIG. 3 is a top-down view generally illustrating a cup holder employing an optical position sensor according to one embodiment of the present invention.

FIG. 3 provides a top-down view of the floor console 8 of vehicle 2. As shown, floor console 8 includes cupholders 32. Cupholders 32 are configured to receive and securely hold cups, cans, or bottles having a size smaller than the diameter of the cupholders 32 for easy accessibility by a driver and/or passengers of vehicle 2. Floor console 8 also includes floor console illuminators 34. Floor console illuminators 34 are configured to provide light in the general vicinity of cupholders 32 to make it easier for drivers and/or users of vehicle 2 to utilize cupholders 32 in low-light conditions. As shown, floor console illuminators 34 are located beneath a translucent surface near cupholders 32. In another embodiment, floor console illuminators 34 are located in at least one of cupholders 32, or in a location near enough floor console 8 that they can provide illumination for cupholders 32. Floor console 8 also includes a basic optical position sensor 30 located beneath an optical sensor area 36. Optical sensor area 36 is a translucent area of the surface of floor console 8. Although optical sensor area 36 is shown as a rectangle, it should be appreciated that optical sensor area 36 could have a shape other than a rectangle, and could have a size different than the size shown in FIG. 3, provided that optical elements of basic optical position sensor 30 are able to transmit light through optical sensor area 36, and receive reflected light through optical sensor area 36. As shown, basic optical position sensor 30 is coupled to floor console illuminators 34, and is configured to control the brightness of floor console illuminators 34, based on the position of a driver or passenger's hand relative to the surface of optical sensor area 36.

Figure 4:
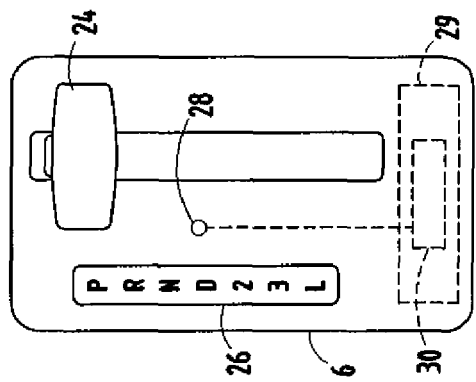
FIG. 4 is a top-down view generally illustrating a transmission control employing an optical position sensor according to one embodiment of the present invention.

FIG. 4 provides a top-down close-up view of transmission control 6 of vehicle 2. As shown, transmission control 6 includes transmission shift lever 24, configured to be operated by a driver of vehicle 2 to control the transmission of vehicle 2. Transmission control 6 also includes transmission position indicator 26 coupled to transmission shift lever 24 and configured to indicate the selected position of the transmission of vehicle 2. Transmission control 6 also includes transmission control illuminator 28 located adjacent to transmission control 6 configured to provide illumination in the vicinity of transmission position indicator 26 and transmission shift lever 24.

As shown, transmission control illuminator 28 is located beneath a translucent surface of transmission control 6. In an alternative embodiment, transmission control illuminator 28 is located elsewhere, but near enough to transmission control 6 to provide illumination of transmission position indicator 26 and transmission shift lever 24. Transmission control 6 also includes a basic optical position sensor 30 located beneath an optical sensor area 29. As shown, optical sensor area 29 is a translucent area of the surface of transmission control 6. Optical sensor area 29 and basic optical position sensor 30 are positioned relative to each other, such that optical elements of basic optical position sensor 30 can transmit light through, and receive reflected light through, optical sensor area 29.

Although optical sensor area 29 is shown in FIG. 4 as a rectangle, it should be appreciated that optical sensor area 29 can have other shapes and sizes, provided that basic optical position sensor 30 can send light through, and receive reflected light through, optical sensor area 29. As shown, basic optical position sensor 30 is coupled to transmission control illuminator 28, and is configured to control the illumination level provided by transmission control illuminator 28 based on the movement of a driver or occupant's hand in the vicinity of optical sensor area 29. In an alternate embodiment, basic optical position sensor 30 is coupled to a light emitting device adjacent transmission position indicator 22, such that basic optical position sensor 30 controls the illumination level of the light emitting device to provide illumination of transmission indicator 22.

Figure 5:
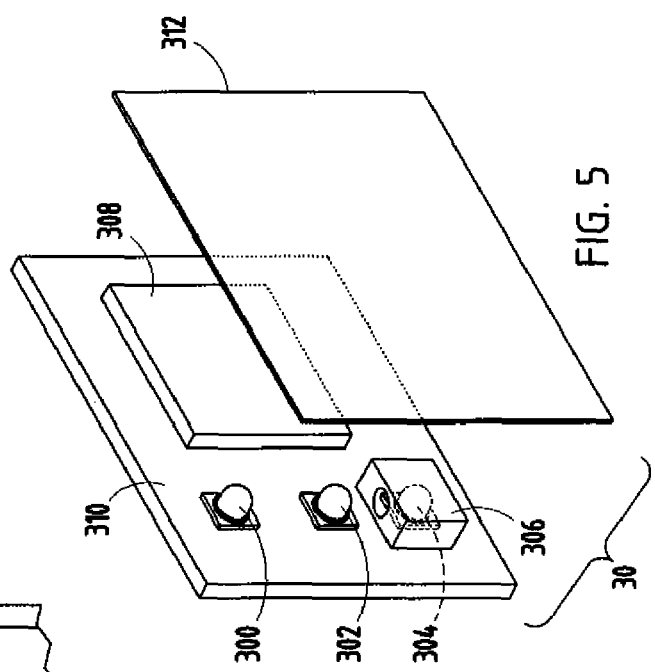
FIG. 5 is a perspective view of an optical position sensor according to the embodiments of FIGS. 3 and 4.

FIG. 5 provides a perspective view of a basic optical position sensor 30 employed in transmission control 6 and floor console 8 of FIGS. 3 and 4. As shown, basic optical position sensor 30 may be positioned behind a translucent surface 312 that is capable of transmitting light. In an alternate embodiment, basic optical position sensor 30 may be positioned behind a transparent surface. Basic optical position sensor 30 includes sensor processing circuitry 308, electrically coupled to a source LED 300, a photodiode 302, and a compensation LED 304. In the present embodiment, source LED 300 and compensation LED 304 are infra-red LEDs, and photodiode 302 is configured to detect light in the infra-red range. In an alternate embodiment, source LED 300 and compensation LED 304 emit light other than infra-red light, and photodiode 302 is configured to detect light other than infra-red light. Sensor processing circuitry 308 includes outputs (not shown) for coupling to additional circuitry. These outputs can directly control additional circuitry, such as light emitting devices, and/or can provide control signals to other processing circuitry. Basic optical position sensor 30 is also shown having a shield 306 for at least partially shielding compensation LED 304.

In operation, sensor processing circuitry 308 controls the intensity of the light provided by source LED 300 and compensation LED 304. Sensor processing circuitry 308 monitors photodiode 302, which provides a feedback signal indicative of the amount of light it receives. Sensor processing circuitry 308 varies the intensity of the light provided by compensation LED 304 based on the feedback signal provided by photodiode 302. Source LED 300, compensation LED 304, and photodiode 302 are configured, such that photodiode 302 can only receive light from two possible sources. The first source of light provided to photodiode 302 is that provided directly by compensation LED 304 that is not reflected from any object in the vicinity of translucent surface 312. The second source of light provided to photodiode 302 is light provided from source LED 300 that is reflected from an object in the vicinity of the surface of translucent surface 312. As shown, basic optical position sensor 30 includes shield 306. By covering compensation LED with shield 306, light from compensation LED 304 is only provided directly to photodiode 302, and is not permitted to reflect from objects in the vicinity of translucent surface 312 before reaching photodiode 302. In the present embodiment, source LED 300 and photodiode 302 are also configured, such that light does not travel directly from source LED 300 to photodiode 302.

Sensor processing circuitry 308 monitors the light received by photodiode 302, and controls the light provided by compensation LED 304, such that the sum of the direct light received from compensation LED 304 and the reflected light received from source LED 300 equals a constant. As objects approach translucent surface 312, an increasing amount of light from source LED 300 will be reflected from the approaching object and received by photodiode 302, decreasing the amount of light provided by compensation LED 304. By monitoring the light provided by compensation LED 304, sensor processing circuitry 308 is able to determine when objects are approaching the surface of translucent surface 312, approximately how far away from the surface of translucent surface 312 those objects are, and when those objects contact the surface of translucent surface 312. As described below, information relating to the motion of objects in the vicinity of translucent surface 312 is used by sensor processing circuitry 308 to determine if and when control signals are issued by sensor processing circuitry 308 to other circuitry and/or devices to control those devices, and/or to directly control additional circuitry, such as light emitting devices. As shown, source LED 300, photodiode 302, compensation LED 304, shield 306, and sensor processing circuitry 308 are mounted on a substrate 310 located behind translucent surface 312.

Figure 6:
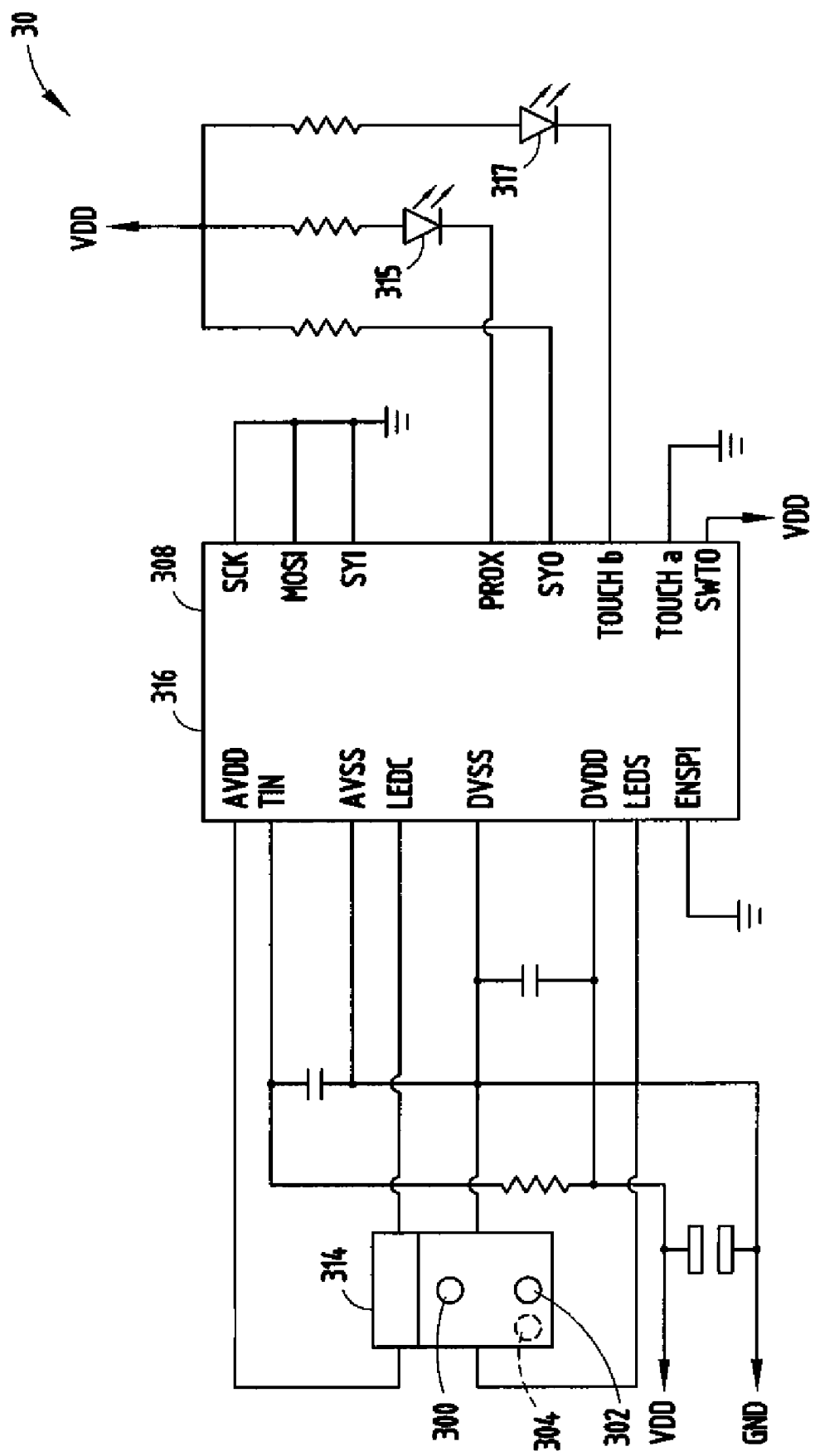
FIG. 6 is a circuit diagram of an optical position sensor according to the embodiments of FIGS. 3 and 4.

FIG. 6 is a circuit diagram of one specific embodiment of a basic optical position sensor 30 generally illustrated in FIG. 5, in which sensor processing circuitry 308 is implemented by an optical switch integrated circuit (IC) 316, and is used to directly control light emitting devices. Basic optical position sensor 30 includes an LED IC 314 coupled to an optical switch IC 316. As shown, LED IC 314 may be an integrated optical module TCND3000, commercially available from Vishay Intertechnology, Inc., and described in document number 84606, Rev. 1.1, 2 Nov. 2004, published by Vishay Intertechnology, Inc. LED IC 314 includes a source LED 300, a photodiode 302, and a compensation LED 304, each of which is coupled to optical switch IC 316. As shown, optical switch IC 316 may be an optical switch E909.01, commercially available from ELMOS Semiconductor AG, and described in QM-No.: 03SP0277E.02, dated Feb. 24$^{th}$, 2004, published by ELMOS Semiconductor AG. Optical switch IC 316 is configured to monitor photodiode 302, and to provide power to source LED 300 and compensation LED 304. Optical switch IC 316 is also configured to monitor the signals provided by it to LED IC 314, and feedback signals provided by LED IC 314, and use that information to evaluate the motion of an object in the vicinity of LED IC 314. Based on its evaluation, optical switch IC 316 is configured to provide control signals to other circuitry to which it is coupled.

Optical switch IC 316 includes an LEDS output for providing power to source LED 300. Optical switch IC 316 also includes an LEDC output for providing power to compensation LED 304. Optical switch IC 316 also includes an input TIN coupled to photodiode 302 for providing a signal indicative of the amount of light received at photodiode 302 to optical switch IC 316. Light from source LED 300 travels from source LED 300 through a translucent surface 312 (not shown). If an object is in the vicinity of the translucent surface 312, light from source LED 300 will be reflected from the surface of the object back through the translucent surface 312, where it is received by photodiode 302. Compensation LED 304 transmits light, such that its light does not travel through the translucent surface 312 (not shown), but is instead transmitted directly to, and received directly by, photodiode 302, without being reflected. Logic in optical switch IC 316 monitors the amount of light received by photodiode 302, and alters the light provided by compensation LED 304, such that the amount of light received by photodiode 302 remains approximately constant.

It should be appreciated that, when no objects are present in the vicinity of the translucent surface, little, if any, of the light provided by source LED 300 through the translucent surface 312 is reflected and received by photodiode 302. In this situation, in order to keep the amount of light received by photodiode 302 constant, optical switch IC 316 will increase the amount of light provided by compensation LED 304. However, when an object does enter the vicinity of the translucent surface 312, the amount of light transmitted by source LED 300, reflected from the object, and received by, photodiode 302, will be increased. In this situation, in order to keep the amount of light received by photodiode 302 constant, optical switch IC 316 decreases the amount of light transmitted by compensation LED 304. In this manner, the amount of light provided by compensation LED 304 decreases as objects approach the translucent surface 312. The closer an object is to the translucent surface 312, the more reflected light from source LED 300 that is received by photodiode 302, and the less light that is provided by compensation LED 304.

Optical switch IC 316 is configured to monitor the amount of power provided to compensation LED 304. The amount of power provided to compensation LED 304 will vary in proportion to the amount of light provided by compensation LED 304. By monitoring the amount of power provided by compensation LED 304, and the rate of change of that power, optical switch IC 316 can determine the proximity of objects to a translucent surface 312 adjacent to LED IC 314, and can also determine when that surface has been touched by an object. Using this information, optical switch IC 316 performs a number of control functions. One function is a proximity sensing and indicating function. Optical switch IC 316 is shown including a PROX output coupled to an LED 315. When optical switch IC 316 determines that an object is within a certain distance of LED IC 314, and/or a translucent surface 312 adjacent to LED IC 314, optical switch IC 316 provides a low output signal on the PROX signal line. As shown, LED 315 has its anode coupled through a resistor to voltage VDD, and its cathode coupled to the PROX output of optical switch IC 316. When the PROX output goes low, the LED 315 emits light. In this manner, light is generated when an object comes within a certain distance of LED IC 314, and/or a translucent surface 312 adjacent to LED IC 314. In one embodiment, light is generated when an object comes within approximately 5 centimeters of LED IC 314.

Although the PROX output is shown coupled to an LED 315, it should be appreciated that, in an alternate embodiment, the PROX output could be coupled to another device configured to emit light in response to a low logic signal from the PROX output. It should also be appreciated that in still another alternate embodiment, the PROX output could be provided to additional logic that is configured to control lights and/or other circuit devices based on the state of the PROX output.

Optical switch IC 316 is also shown having an input ENSPI, which is coupled to ground. ENSPI is configured to enable or disable a Serial Peripheral Interface (SPI) interface mode for optical switch IC 316. As shown, with ENSPI tied to ground, the SPI mode of optical switch IC 316 is disabled. Optical switch IC 316 also includes multi-function pins TOUCH_b and TOUCH_a. In the present embodiment, with the SPI mode of optical switch IC 316 disabled, TOUCH_b and TOUCH_a serve as a switch. When the switch is closed, circuitry connected to TOUCH_b is electrically coupled to circuitry connected to TOUCH_a. In operation, optical switch IC 316 determines when an object has touched LED IC 314 or a translucent surface 312 adjacent to LED IC 314 based on the amount of power provided to compensation LED 304, as noted above. When optical switch IC 316 determines that a touch has occurred, optical switch IC 316 causes the switch to close, electrically coupling the items connected to TOUCH_b with those connected to TOUCH_a.

The switching mode of optical switch IC 316 is controlled by an input SWT0. This input toggles between "TOUCH" or "TOGGLE" mode. In TOUCH mode, the switch is closed only while optical switch IC 316 detects that an object is currently touching LED IC 314, or a translucent surface 312 adjacent to LED IC 314. In TOGGLE mode, optical switch IC 316 toggles the switch between open and closed states each time a touch is detected. For example, if the switch is in a closed state, and a touch is detected, the switch changes to an open state, until another touch is detected. When another touch is detected, the switch changes to a closed state, and maintains the closed state until another touch is detected. When SWT0 is tied low, the switch operates in TOUCH mode. When SWT0 is tied high, as in FIG. 6, the switch operates in TOGGLE mode.

As shown, TOUCH_b is coupled to the cathode of an LED 317. The anode of LED 317 is tied to VDD. When the switch of optical switch IC 316 is closed, the cathode of LED 317 is connected to ground through the switch connecting TOUCH_b with TOUCH_a, causing the LED to light. When the switch is open, the LED 317 will be off. In this manner, when optical switch IC 316 detects that an object has touched LED IC 314, it causes the switch between TOUCH_b and TOUCH_a to toggle, causing the on/off state of LED 317 to also toggle in response to touches. It should be appreciated that although the switch of optical switch IC 316 is shown being used to control LED 317, the switch of optical switch IC 316 could be used to control other illumination devices or circuit devices, and could also be coupled to additional processing circuitry, which could, in turn, control other circuit devices based on the state of the switch.

Figure 7:
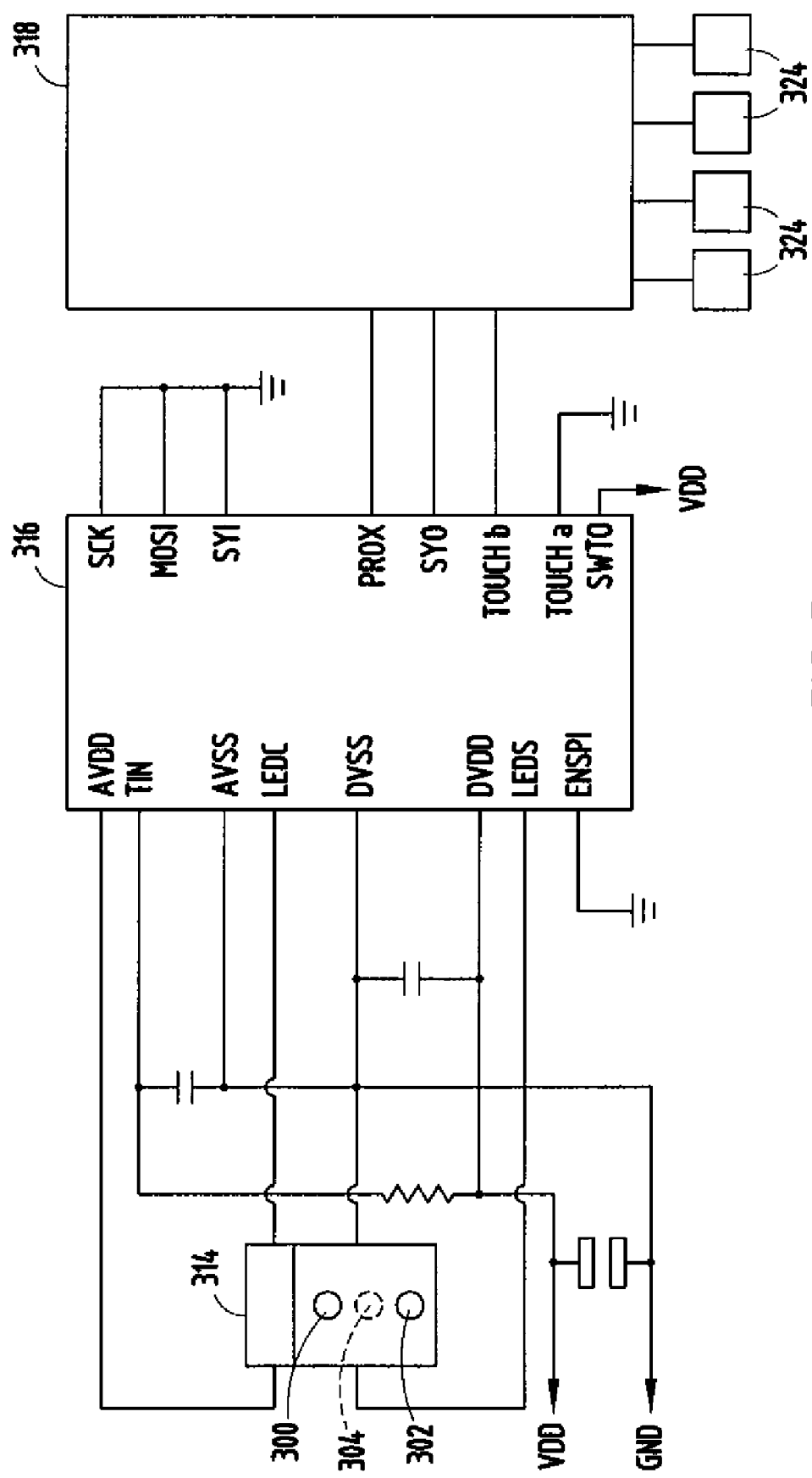
FIG. 7 is a circuit diagram of an optical position sensor according to another embodiment of the present invention.

FIG. 7 is a circuit diagram of another specific embodiment of a basic optical position sensor 30 generally illustrated in FIG. 5. The embodiment of FIG. 7 is identical to the embodiment of FIG. 6, with the exception that optical switch IC 316 is coupled to electronic device control circuitry 318, rather than directly to LEDs 315 and 317. Electronic device control circuitry 318 is shown further coupled to electronic devices 324. In the present embodiment, electronic devices 324 are lamps. Electronic device control circuitry 318 is configured to monitor the PROX signal and the state of the switch in optical switch IC 316, and uses that information to control the state of electronic devices 324. When the PROX signal indicates that an object is within a certain distance of LED IC 314 and/or an adjacent translucent surface 312, electronic device control circuitry 318 causes lamps 324 to turn on. In one embodiment, device control circuitry 318 causes lamps 324 to turn on when an object is within 5 centimeters of LED IC 314. The lamps 324 remain on until the PROX signal indicates that the object is no longer within a certain distance of LED IC 314 and/or an adjacent translucent surface 312. The on/off state of lamps 324 can also be toggled on or off by electronic device control circuitry 318, based on the state of the switch in optical switch IC 316, which indicates when adjacent translucent surface 312 is touched. If lamps 324 are initially off and the translucent surface 312 is then touched, optical switch IC 316 closes, indicating to electronic device control circuitry 318 that an object has touched the surface of LED IC 314 and/or an adjacent translucent surface 312. Electronic device control circuitry 318 then causes lamps 324 to turn on. If the translucent surface 312 is again contacted by an object, the switch of optical switch IC 316 toggles to the open position, and electronic device control circuitry 318 causes lamps 324 to turn off. In this manner, the on/off state of lamps 324 is controlled by electronic device control circuitry 318, based on whether or not an object is within a certain distance of LED IC 314 or an adjacent translucent surface 312, or has touched the adjacent translucent surface 312 or LED IC 314.

In alternate embodiments to the embodiments generally illustrated in FIGS. 6 and 7, it should be appreciated that circuitry other than LED IC 314 and optical switch IC 316 may be employed to control LEDs 315, 317, and electronic devices 324. In one alternate embodiment, the circuitry includes at least the following: a source LED 300; a compensation LED 304; a photodiode 302 for receiving light directly from compensation LED 304 and reflected light from source LED 300; and control circuitry for providing power to source LED 300 and compensation LED 304, monitoring the light received at photodiode 302, and controlling the light provided by compensation LED 304, such that the light received by photodiode 302 remains constant. The control circuitry is configured to monitor the power provided by compensation LED 304, and uses this information to determine the motion characteristics of an object near photodiode 302, such as the relative distance of the object from photodiode 302, the velocity and/or acceleration of the object in the vicinity of photodiode 302, the amount of time the object is in the vicinity of photodiode 302, and whether or not the object is touching photodiode 302, or a translucent surface 312 in the vicinity of photodiode 302. The control circuitry then controls other electronic devices, including light emitting devices, based on the motion characteristics.

Returning to FIG. 4, when an individual's hand approaches the surface of optical sensor area 29, and reaches a certain distance from the surface, optical switch IC 316 determines that a predetermined threshold has been crossed. In one embodiment, the predetermined threshold is approximately 5 centimeters from the surface of optical sensor area 29. This causes PROX to go low, in turn causing LED 315 to turn on to provide lighting in the general area of transmission control 6. If an individual's hand is later moved away from the vicinity of the surface of optical sensor area 29, optical switch IC 316 detects when the hand passes back across the threshold, causing PROX to go high and causing LED 315 to turn off. If a user's hand contacts the surface of optical sensor area 29, optical switch IC 316 detects this contact, based on the power provided to, and received from, LED IC 314. This contact causes the switch joining TOUCH_b with TOUCH_a to toggle. In this manner, a user can turn LED 317 on or off, depending on whether illumination is needed, by successively contacting optical sensor area 29. While this embodiment employs a basic optical position sensor 30 as generally illustrated in FIG. 6, it should be appreciated that additional circuitry, such as electronic device control circuitry 318 of the embodiment of FIG. 7, could be provided, such that PROX, TOUCH_b and TOUCH_a could be used in combination with device control circuitry 318 to provide for more elaborate control of lights or other devices associated with transmission control 6.

In an alternate embodiment (not shown) of the transmission control 6 generally illustrated in FIG. 4, multiple light emitting devices of various colors or hues are coupled to basic optical position sensor 30. In this embodiment, basic optical position sensor 30 is implemented as generally illustrated in FIG. 7, having additional circuitry 318 coupled to the PROX, TOUCH_b, and TOUCH_a connections of optical switch IC 316. In this embodiment, electronic device control circuitry 318 is coupled to multiple light emitting devices 324 of various colors. As the switch in optical switch IC 316 toggles in response to successive touches to optical sensor area 29, electronic device control circuitry 318 causes successive light emitting devices 324 to illuminate in response to successive touches to optical sensor area 29. For example, in an initial state, all light emitting devices 324 are off. When optical sensor area 29 is touched for the first time, electronic device control circuitry 318 causes a generally white light emitting device 324 to turn on. When optical sensor area 29 is touched for a second time, electronic device control circuitry 318 causes the generally white light emitting device 324 to turn off, and causes a generally blue light emitting device 324 to turn on. When optical sensor area 29 is touched for a third time, electronic device control circuitry 318 causes the generally blue light emitting device 324 to turn off, and a generally red light emitting device 324 to turn on. When optical sensor area 29 is touched for a fourth time, electronic device control circuitry 318 causes the generally red light emitting device 324 to turn off. In this manner, by successively touching optical sensor area 29, a user may control not only the on/off state of light emitting devices 324, but also the color or hue of the light emitted by light emitting devices 324.

It should be appreciated that in alternate embodiments, additional or fewer light emitting devices may be used, and that the light emitting devices may be of any number of colors. It should also be appreciated that in yet another alternate embodiment, a single LED device may be utilized that includes multiple LED chips of various colors, each of which may be independently activated. It should also be appreciated that electronic device control circuitry 318 may also monitor the PROX output of optical switch IC 316, and may cause any number of light emitting devices 324 of various colors to turn on when an object is within a certain distance of optical sensor area 29, and to turn off when an object is no longer within a certain distance of optical sensor area 29.

Returning to FIG. 3, floor console 8 is shown having a basic optical position sensor 30 for controlling lights 34 in the vicinity of cupholders 32. As shown, basic optical position sensor 30 is implemented in a manner similar to the embodiment generally illustrated in FIG. 7. In this embodiment, electronic devices 324 are light emitting devices 34 located near cupholders 32. As before, electronic device control circuitry 318 monitors the PROX, TOUCH_b, and TOUCH_a outputs of optical switch IC 316. If an object, such as a hand, approaches to within a certain distance of optical sensor area 36, optical switch IC 316 pulls the PROX signal to a low state. When electronic device control circuitry 318 detects that PROX has been pulled low, it causes light emitting devices 324 to turn on, generally illuminating the areas in the vicinity of cupholders 32. When the object moves away from optical sensor area 36, such that it is no longer within a certain distance of optical sensor area 36, optical switch IC 316 causes PROX output to return high. When electronic device control circuitry 318 determines that the PROX output has returned high, it causes light emitting devices 324 to turn off. In an alternate embodiment, basic optical position sensor 30 is also configured to allow a user to switch light emitting devices 324 on or off by touching optical sensor area 36. When optical switch IC 316 detects that the surface of optical sensor area 36 has been touched, it causes its switch to toggle. If the switch was initially open, a touch will cause the switch to close. If the switch was initially closed, a touch will cause the switch to open. Electronic device control circuitry 318 monitors the state of the switch, and causes light emitting devices 324 to turn on or off based on the change in state of the switch. In this manner, a user may turn light emitting devices 324 on or off by successive touches to optical sensor area 36. It should be appreciated that in an alternate embodiment, the basic optical position sensor 30 of floor console 8 could be implemented as described in the embodiment generally illustrated in FIG. 6, such that light emitting devices 324 are directly controlled by optical switch IC 316.

Figure 8:
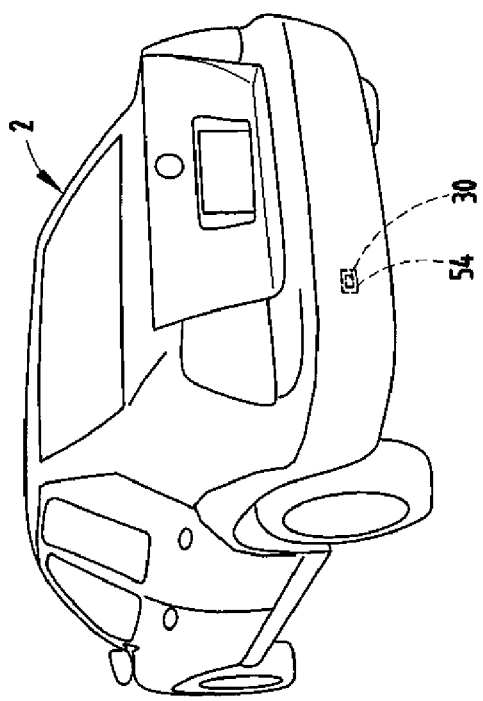
FIG. 8 is a perspective view of a vehicle incorporating an optical position sensor according to another embodiment of the present invention.

FIG. 8 is a view of the rear of a vehicle 2 that includes an optical sensor area 54 located on the rear of the vehicle 2. As shown, optical sensor area 54 includes yet another embodiment of a basic optical position sensor 30. Optical sensor area 54 is a translucent area configured such that light from a source LED 300 in basic optical position sensor 30 can be transmitted through optical sensor area 54 to the rear of the vehicle, and such that light from source LED 300 that is reflected from objects to the rear of vehicle 2 can travel back through the optical sensor area 54, and be received by basic optical position sensor 30.

Figure 9:
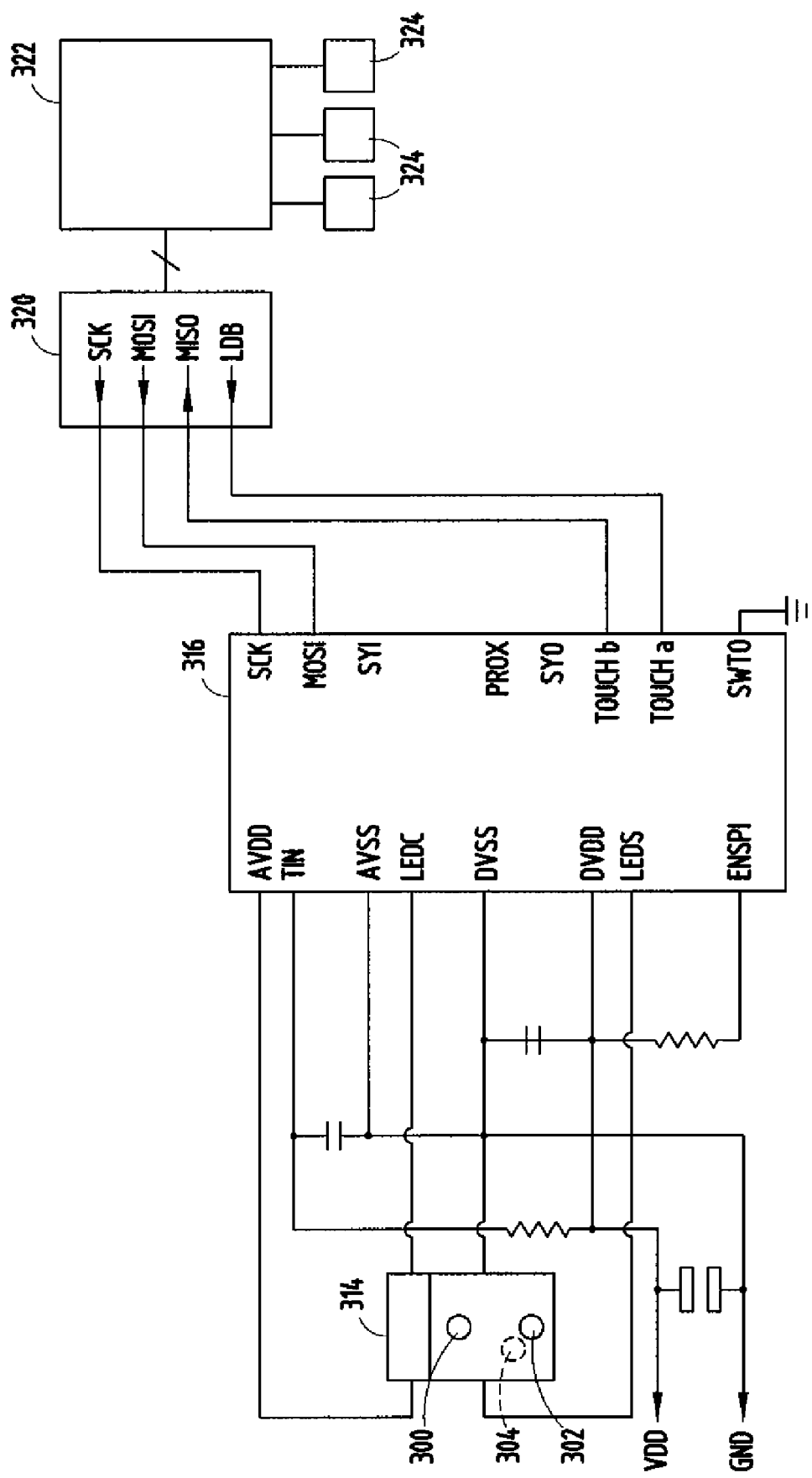
FIG. 9 is a circuit diagram of an optical position sensor according to the embodiment of FIG. 8.

FIG. 9 provides a more detailed circuit diagram of the embodiment of a basic optical position sensor 30 employed in optical sensor area 54 of FIG. 8. The basic optical area sensor 30 generally illustrated in FIG. 9 operates in a manner similar to the basic optical position sensors 30 of FIGS. 6 and 7, with the exception that the SPI outputs of optical switch IC 316 are now utilized to communicate position information and control electronic devices 324, rather than PROX, TOUCH_b, and TOUCH_a signals of optical switch IC 316. As shown, the ENSPI input of optical switch IC 316 is tied high through a resistor, causing TOUCH_b and TOUCH_a pins to take on the functions of MISO and LDB, respectively, in the SPI interface protocol. Tying ENSPI high also serves the purpose of enabling the SPI mode of optical switch IC 316. The SPI-related signals of optical switch IC 316 are coupled to SPI interface logic 320.

As shown, SCK is an SPI serial clock provided by SPI interface logic 320 to optical switch IC 316. MOSI is an SPI master output slave input signal provided by SPI interface logic 320 to optical switch IC 316. The TOUCH_b pin of optical switch IC 316 is configured as a master input slave output (MISO), due to the fact that ENSPI is tied high. This MISO output is coupled to SPI interface logic 320. TOUCH_a is defined as an LDB chip select input, due to the fact that ENSPI is tied high. The TOUCH_a pin is coupled to the LDB output of SPI interface logic 320. In this manner, SPI interface logic 320 can communicate using the SPI protocol with optical switch IC 316. As shown, SPI interface logic 320 is coupled to electronic device control circuitry 322.

By sending an appropriate SPI command, via SPI interface logic 320, to optical switch IC 316, electronic device control circuitry 322 causes optical switch IC 316 to send data to electronic device control circuitry 322, via SPI interface logic 320. The data sent by optical switch IC 316 indicates the state of the switch of optical switch IC 316, and the value of an integrator in optical switch IC 316. The value of the integrator is indicative of the relative distance of an object from LED IC 314. The state of the switch is indicative of whether or not an object is touching the surface of LED IC 314 and/or the surface of optical sensor area 54. By evaluating these signals, electronic device control circuitry 322 can determine the relative distance of an object from the rear of the vehicle 2, the velocity and acceleration of the object, and whether or not the object is touching the rear of the vehicle 2 of FIG. 8.

Electronic device control circuitry 322 is shown coupled to electronic devices 324. In a case of the embodiment of FIG. 8, electronic devices 324 are audible alarms. When electronic device control circuitry 322 determines, based on signals received from optical switch IC 316 via SPI interface logic 320, that an object is within a certain distance of the rear of the vehicle 2, electronic device control circuitry 322 causes audible alarms 324 to turn on. Audible alarms 324 are located such that a driver of the vehicle will be able to hear audible alarms 324. Audible alarms 324 remain on until electronic device control circuitry 322 determines, based on the signal received from optical switch IC 316, that an object is no longer within a certain distance of the rear of the vehicle 2. In this manner, the driver of the vehicle is notified when objects are within a certain distance of the rear of vehicle 2. It should be appreciated that devices other than, or in addition to, audible alarms 324 can be coupled to electronic device control circuitry 322 to provide additional notification to the driver of vehicle 2. For example, a visible indicator or light emitting device 324 could also be coupled to electronic device control circuitry 322 to provide a visual indication to the driver that an object is within a certain distance of the rear of the vehicle 2.

Although in the present embodiment, optical switch IC 316 communicates information via a SPI bus and SPI interface logic 320, it should be appreciated that, in an alternate embodiment similar to the embodiment generally illustrated in FIG. 7, the PROX output of optical switch IC 316 is directly provided to electronic device control circuitry 318, which, in turn, controls electronic devices 324, including audible and/or visual notification devices. In this manner, when optical switch IC 316 determines that an object is within a certain distance of LED IC 314 and/or the translucent surface 312 adjacent to LED IC 314, it causes PROX to go low. In response, electronic device control circuitry 318 causes electronic device and/or devices 324 to turn on, indicating that an object is within a certain distance of the rear of the vehicle 2. When electronic device control circuitry 318 determines, based on the PROX signal from optical switch IC 316, that an object is no longer within a certain distance of the rear of the vehicle 2, electronic device control circuitry 318 causes electronic devices 324 to turn off, indicating to the driver that an object is no longer within a certain distance of the rear of the vehicle 2.

It should also be appreciated, as noted above, that basic optical position sensor 30 of optical sensor area 54 could also be implemented by devices other than optical switch IC 316 and LED IC 314.

Figure 10:
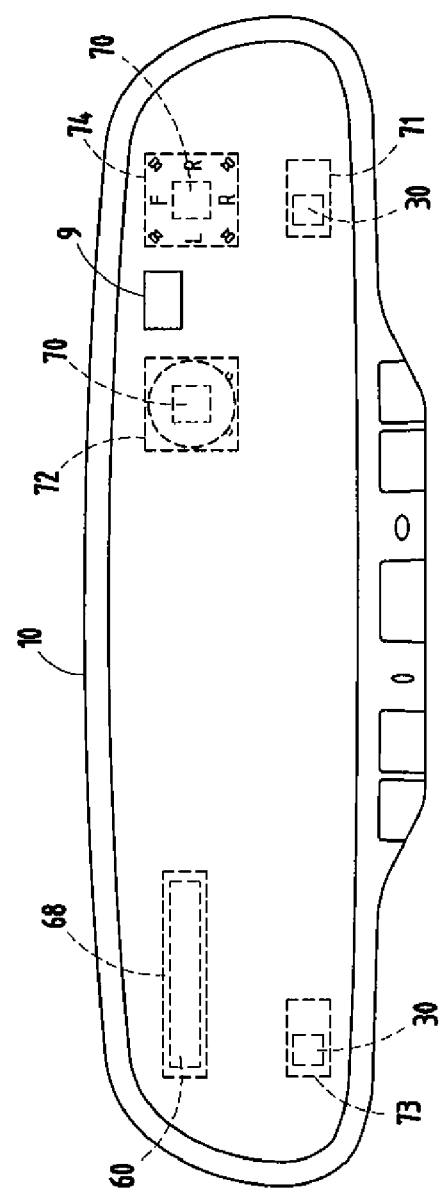
FIG. 10 is a front perspective view generally illustrating a rearview assembly incorporating optical position sensors according to various embodiments of the present invention.

FIG. 10 is a general illustration of a rearview assembly 10 shown in FIGS. 1 and 2 for providing a driver of the vehicle 2 with a view to the rear of the vehicle 2. As shown, rearview assembly 10 includes multiple optical sensor areas on its surface. Two basic optical position sensors 30 are shown located behind optical sensor areas 71 and 73. As shown, optical sensor area 71 is used to control a right maplight (not shown), and optical sensor area 73 is used to control a left maplight (not shown). Rearview assembly 10 also includes a linear optical sensor area 68 adjacent to, and in front of, a linear optical position sensor 60. Rearview assembly 10 also includes an optical sensor area 72 adjacent to, and in front of, an enhanced optical position sensor 70 and an optical sensor area 74 adjacent to, and in front of, an enhanced optical position sensor 70.

Figure 11:
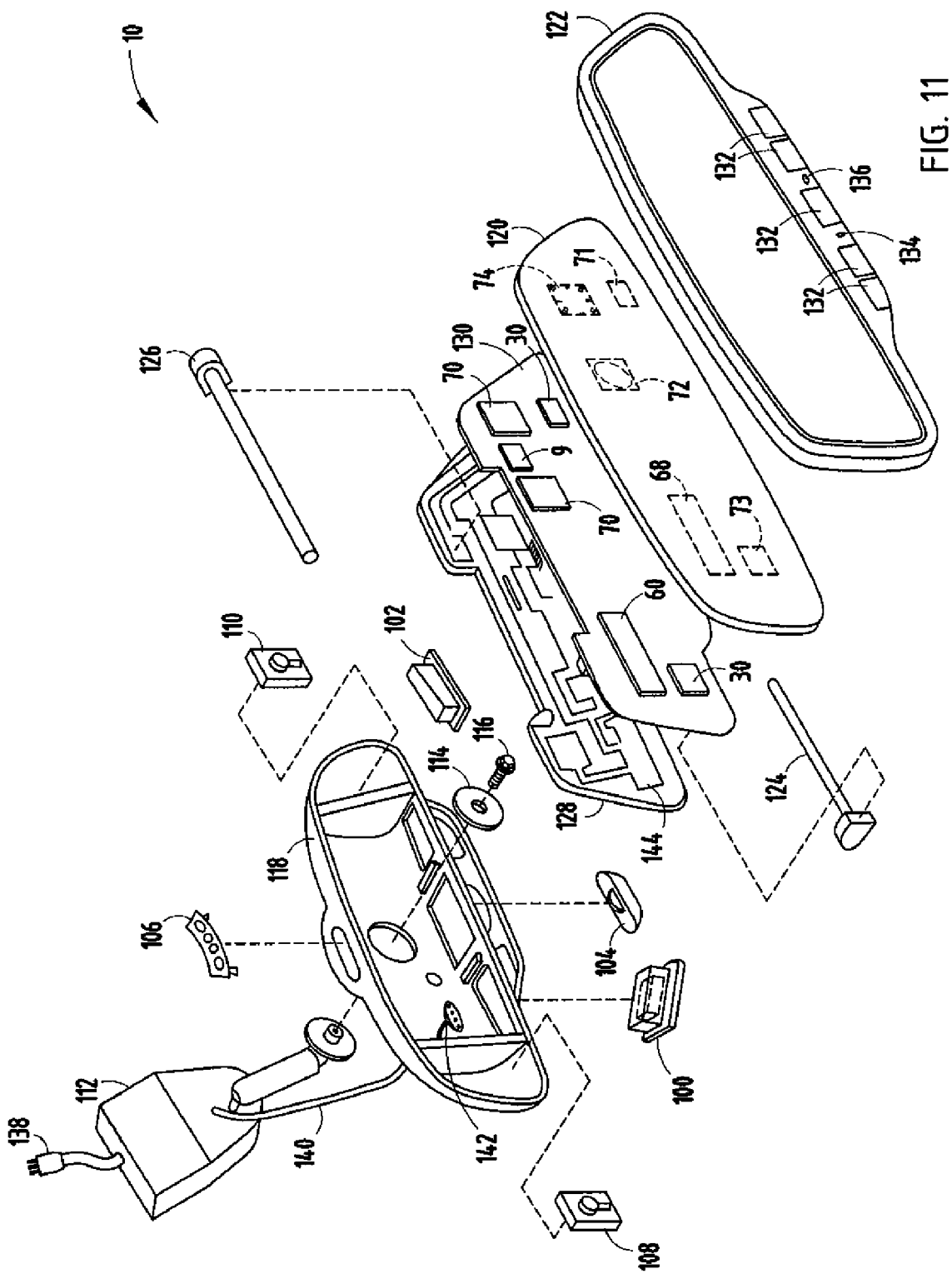
FIG. 11 is an exploded view of the rearview assembly of FIG. 10.

FIG. 11 provides an exploded view of the rearview assembly 10 generally illustrated in FIG. 10. As shown in FIG. 11, rearview assembly 10 may include any one or more of the following: maplights 100 and 102; microphone assemblies 104 and 106; speakers 108 and 110; and a rearview mount 112 for securing the mirror to a vehicle. Rearview assembly 10 may also include a washer 114 and fastener 116 for securing a housing 118 to rearview mount 112, a rearview device having a transflective and/or translucent surface 120, a bezel 122 for holding translucent surface 120 and other elements within housing 118, and antennas 124 and 126. Rearview assembly 10 may also include substrates 128 and 130 to which circuitry 144, basic optical position sensors 30, linear optical position sensor 60, and enhanced optical position sensors 70 are coupled. Bezel 122 is also shown including buttons 132 for controlling various aspects of the mirror, LED indicator 134, and glare sensor 136. In one embodiment, at least one of buttons 132 is a maplight switch configured to control at least one of maplights 100 and 102. Rearview assembly 10 may also include a connectable cable 138 for connecting rearview assembly 10 to other vehicle electronic devices, a cable 140 for joining connectable cable 138 to connectable cable 142, and a connectable cable 142 for providing signals from connectable cable 138 and cable 140 to various electronic devices housed in rearview assembly 10. Commonly assigned U.S. Pat. No. 6,980,092, entitled "VEHICLE REARVIEW MIRROR ASSEMBLY INCORPORATING A COMMUNICATION SYSTEM", commonly assigned U.S. Patent Application Publication No. 2004/0246607, entitled "REARVIEW MIRROR ASSEMBLIES INCORPORATING HANDS-FREE TELEPHONE COMPONENTS", and commonly assigned U.S. Pat. No. 6,700,692, entitled "ELECTROCHROMIC REARVIEW MIRROR ASSEMBLY INCORPORATING A DISPLAY/SIGNAL LIGHT", the entire disclosures of which are incorporated herein by reference, disclose additional rearview assemblies. As used herein, a "rearview device" may be a mirror, an EC mirror, a display, or a combination mirror/display as disclosed in commonly assigned Provisional U.S. Patent Application No. 60/804,351, filed on Jun. 9, 2006, having Danny L. Minnikey as the first named inventor) entitled "VEHICLE REARVIEW ASSEMBLY INCLUDING A TRANSFLECTIVE MIRROR ELEMENT AND A HIGH INTENSITY DISPLAY", the entire disclosure of which is incorporated herein by reference.

Referring to FIGS. 10 and 11, rearview assembly 10 includes a first optical sensor area 73 in a translucent surface adjacent to a basic optical position sensor 30. Basic optical position sensor 30 operates in a manner similar to that discussed in FIG. 7. In this case, electronic device control circuitry 318 is coupled to a maplight 100 for controlling the on/off state of maplight 100. In the present embodiment, electronic device control circuitry 318 causes maplight 100 to turn on when it determines that an object, such as a human hand, is within a certain distance of sensor area 73, and to turn off when an object moves beyond of a certain distance from sensor area 73. Basic optical position sensor 30 is also configured to cause maplight 100 to toggle between on and off states with successive touches to optical sensor area 73. In an alternate embodiment, electronic device control circuitry 318 could be coupled to multiple maplights 100 of various colors, and could cause various maplights 100 to turn on or off, based on successive touches to optical sensor area 73 in a manner similar to that discussed above. In still another alternate embodiment, optical position sensor 30 is configured to control the on/off state of maplight 100 based on the distance of an object from a maplight switch 132.

Rearview assembly 10 may also include a second optical sensor area 71 in a translucent surface adjacent to a basic optical position sensor 30. Optical sensor area 71 and its adjacent basic optical position sensor 30 operate in the same manner as optical sensor area 73 and the adjacent basic optical position sensor 30 to control maplight 102. As noted above, multiple maplights 102 could be toggled on or off based on multiple touches to optical sensor area 73.

Rearview assembly 10 is also shown having a linear optical sensor area 68 in a translucent surface adjacent to, and in front of, a linear optical position sensor 60. As shown, linear optical position sensor 60 is configured to control the brightness of an electronic compass (EC) display 9 in the surface of rearview assembly 10.

FIG. 12 is a block diagram generally illustrating one embodiment of a linear optical position sensor 60 employed in rearview assembly 10. As shown, linear optical position sensor 60 incorporates two basic optical position sensors 30 located at either ends of linear optical sensor area 68. As discussed above, basic optical position sensors 30 are configured to determine the relative distance of an object from the surface of each basic optical position sensor 30. As shown, each basic optical position sensor 30 is coupled to electronic device control circuitry 318, which in the present embodiment is configured to operate as x-y slider dimming control circuitry. Electronic device control circuitry 318 receives from each basic optical position sensor 30, a signal indicative of the relative distance of an object in front of linear optical position sensor 60 and optical sensor area 68. By evaluating the signals provided by each basic optical position sensor 30, electronic device control circuitry 318 determines the relative position of an object on the surface of linear optical sensor area 68 between the basic optical position sensors 30. Electronic device control circuitry 318 then uses this information to control the brightness of electronic compass display 9 in the surface of rearview assembly 10 by controlling the power provided to electronic compass display 9.

In the present embodiment, when an object is at the extreme left end of linear optical sensor area 68 and linear optical position sensor 60, the EC compass lighting will be at its lowest level. On the other hand, when an object is at the rightmost end of linear optical sensor area 68 and linear optical position sensor 60, the EC compass light will be at its brightest. As an object in front of linear optical position sensor 60 and linear optical sensor area 68 moves from left to right across linear optical position sensor 60, the brightness of the EC compass light will be increased. As an object in front of linear optical position sensor 60 and linear optical sensor area 68 moves from right to left, the EC compass brightness will be decreased. Electronic device control circuitry 318 accomplishes this by monitoring the signals from basic optical position sensors 30 that are indicative of the distance of objects from each basic optical position sensor 30, and determining from these signals where the object is located between the basic optical position sensors 30.

In an alternate embodiment, electronic device control circuitry 318 of linear optical position sensor 60 is configured to operate as x-y slider volume control circuitry for controlling the level of an audio signal in the vehicle.

Referring to FIGS. 10 and 11, rearview assembly 10 is also shown including optical sensor areas 72 and 74 in a translucent surface, each of which is in front of, and adjacent to, an enhanced optical position sensor 70. Enhanced optical position sensors 70 operate using the same general principles discussed above with respect to the operation of basic optical positions sensors 30. However, by employing additional source LEDs, an enhanced optical position sensor 70 is able to not only determine when an object is within a certain distance, and/or touches the surface of, the optical sensor 70, but also where an object is located in terms of its position on the surface of translucent optical sensor areas adjacent to the optical sensor 70. This additional functionality is enabled by the use of additional source LEDs and a switching or time-slicing process.

FIG. 13 provides a front view of an enhanced optical position sensor 70. As shown, enhanced optical position sensor 70 includes source LEDs 700, 702, 704, and 706, a compensation LED 710, and a photodiode 708. Enhanced optical position sensor 70 is also shown including a cover 712 covering compensation LED 710 to ensure that photodiode 708 receives only direct light from compensation LED 710, and not light from compensation LED 710 that may be reflected from objects in front of enhanced optical position sensor 70. Enhanced optical position sensor 70 is also shown including sensor processing circuitry 716 coupled to source LEDs 700, 702, 704, and 706, photodiode 708, and compensation LED 710 for controlling and monitoring the power provided to these devices. Sensor processing circuitry 716 is also shown having multiple output lines for coupling to additional electronic circuitry.

FIG. 14 provides a side view of the enhanced optical position sensor 70 generally illustrated in FIG. 13. As shown, enhanced optical position sensor 70 includes a substrate 714 to which the components discussed in FIG. 13 are coupled. Enhanced optical position sensor 70 is also shown having a translucent surface 701 positioned in front of source LEDs 700, 702, 704, and 706, photodiode 708, and compensation LED 710. Translucent surface 701 is made of a material such that light may travel from each of source LEDs 700, 702, 704, and 706 to objects located in front of translucent surface 701. Translucent surface 701 is also configured such that light from source LEDs 700, 702, 704, and 706 that is reflected from objects in front of translucent surface 701 can be transmitted back through its surface and received by photodiode 708.

Figure 15:
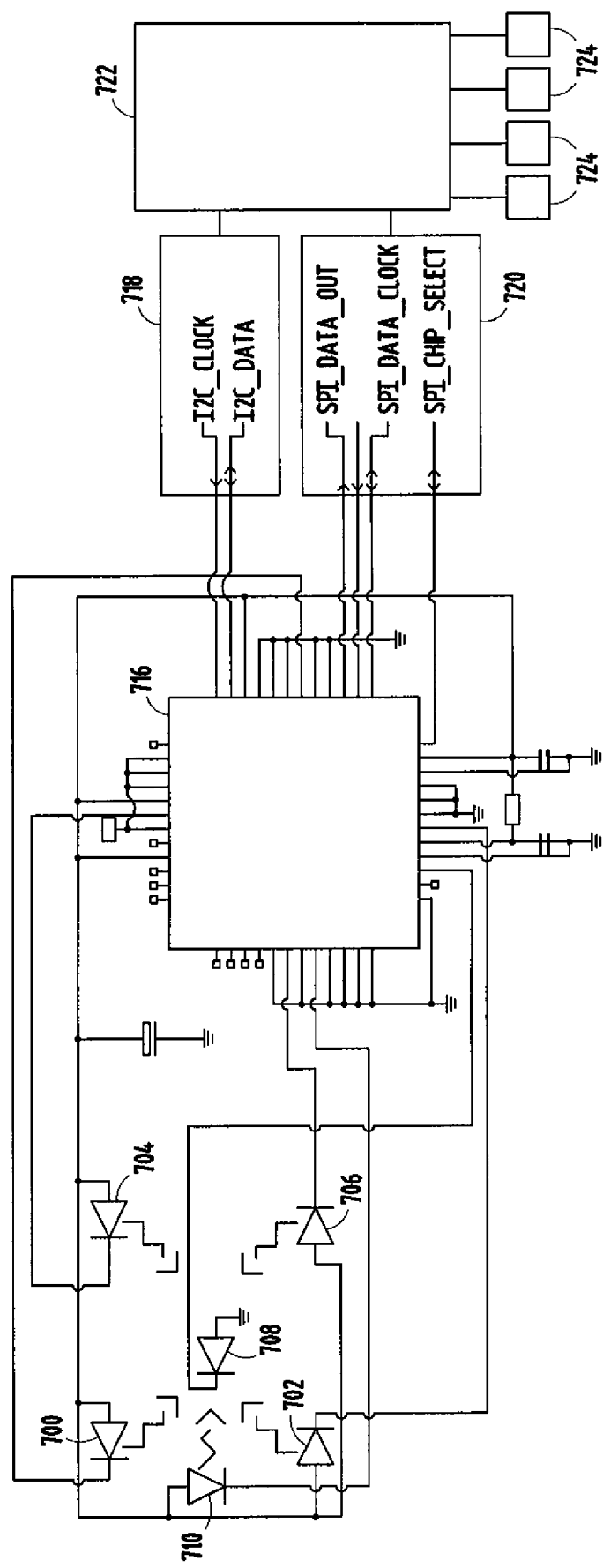
FIG. 15 is a circuit diagram generally illustrating the optical position sensor of FIG. 13, according to one embodiment of the present invention.

FIG. 15 provides a circuit diagram of one embodiment of the enhanced optical position sensor 70 generally illustrated in FIGS. 13 and 14. Sensor processing circuitry 716 is shown coupled to each of the source LEDs 700, 702, 704, and 706, and is configured to control and monitor power provided to those source LEDs. Sensor processing circuitry 716 is also shown coupled to compensation LED 710, and is configured to control and monitor power provided to compensation LED 710. Sensor processing circuitry 716 is also shown coupled to photodiode 708, and is configured to receive a signal from photodiode 708 indicative of the amount of light received by photodiode 708. As shown, sensor processing circuitry 716 is an optical sensor IC Part No. E909.02, commercially available from ELMOS Semiconductor AG, and described in data sheet document number QM-No.: 03SP0066E.02, published on Sep. 29, 2004 by ELMOS Semiconductor AG. Sensor processing circuitry 716 operates in a manner similar to optical switch IC 316 in that it monitors the light received by photodiode 708, and adjusts the power provided to compensation LED 710, such that the light received by photodiode 708 remains relatively constant. However, in this case, photodiode 708 not only receives light directly from compensation LED 710, but also receives light from multiple source LEDs 700, 702, 704, and 706 that has been reflected from objects in front of translucent surface 701. The amount of reflected light received by photodiode 708 from source LEDs 700, 702, 704, and 706 will vary, depending on the relative position of an object from which the light reflects to photodiode 708 in front of translucent surface 701.

In order to enable a determination of the location of an object on the surface of translucent surface 701, sensor processing circuitry 716 uses a switching or time-slicing scheme by which source LEDs 700, 702, 704, and 706 are turned on and off at specific predetermined times, such that none of the source LEDs are on at the same time. For example, during a hypothetical time period T1, sensor processing circuitry 716 causes LED 700 to be turned on, while LEDs 702, 704, and 706 are turned off. During this time, sensor processing circuitry 716 determines a value indicative of the distance of an object from source LED 700. It does this by evaluating the signal received from photodiode 708 along with the power provided to compensation LED 710 in a manner similar to that discussed above with respect to basic optical position sensor 30. After the time period T1 has ended, source LED 700 is switched off, and another LED, such as source LED 702, is switched on during a time period T2. Sensor processing circuitry 716 then determines a value indicative of the distance of the object from source LED 702 by evaluating the signal received from photodiode 708 and the power provided to compensation LED 710. After the time period T2 is over, LED 702 is switched off, and LED 704 is switched on during time T3. During this time period, sensing processor circuitry 716 determines a value indicative of the distance of an object from source LED 704 in the same manner as discussed above. At the end of time period T3, source LED 704 is switched off, and source LED 706 is switched on to begin time period T4. During time period T4, sensing processor circuitry 716 determines a value indicative of the distance of the object from source LED 706 in the same manner as discussed above. After the end of time period T4, source LED 706 is switched off, and the cycle begins again by switching on source LED 700 for a time period T1.

It should be appreciated that at the end of a cycle, sensor processing circuitry 716 will have determined values indicative of the relative distance of an object on or near translucent surface 701 from each of source LEDs 700, 702, 704, and 706. Because the position of source LEDs 700, 702, 704, and 706 is known, electronic device control circuitry 722 can calculate the position of an object on or near the surface of translucent surface 701 by utilizing the values provided by sensor processing circuitry 716 and the known positions of source LEDs 700, 702, 704, and 706.

It should also be appreciated that once electronic device control circuitry 722 has determined the initial position of an object on translucent surface 701, it can also determine subsequent positions in subsequent cycles using data provided by sensor processing circuitry 716, and can therefore trace the path of motion of an object on or near translucent surface 701. In this manner, various control schemes can be implemented using enhanced optical position sensor 700, two of which are used in the present embodiment of rearview assembly 10. The first is a rotary control device, and the second is a left/right/ front/rear control device, each of which are discussed below.

Sensor processing circuitry 716 includes circuitry that monitors the power provided to compensation LED 710, and stores a count number representative of a magnitude of that power during the measurement cycles when each of source LEDs 700, 702, 704, and 706 are switched on. Sensor processing circuitry 716 is configured to provide those values to electronic device control circuitry 722 using one of three methods.

Figure 16:
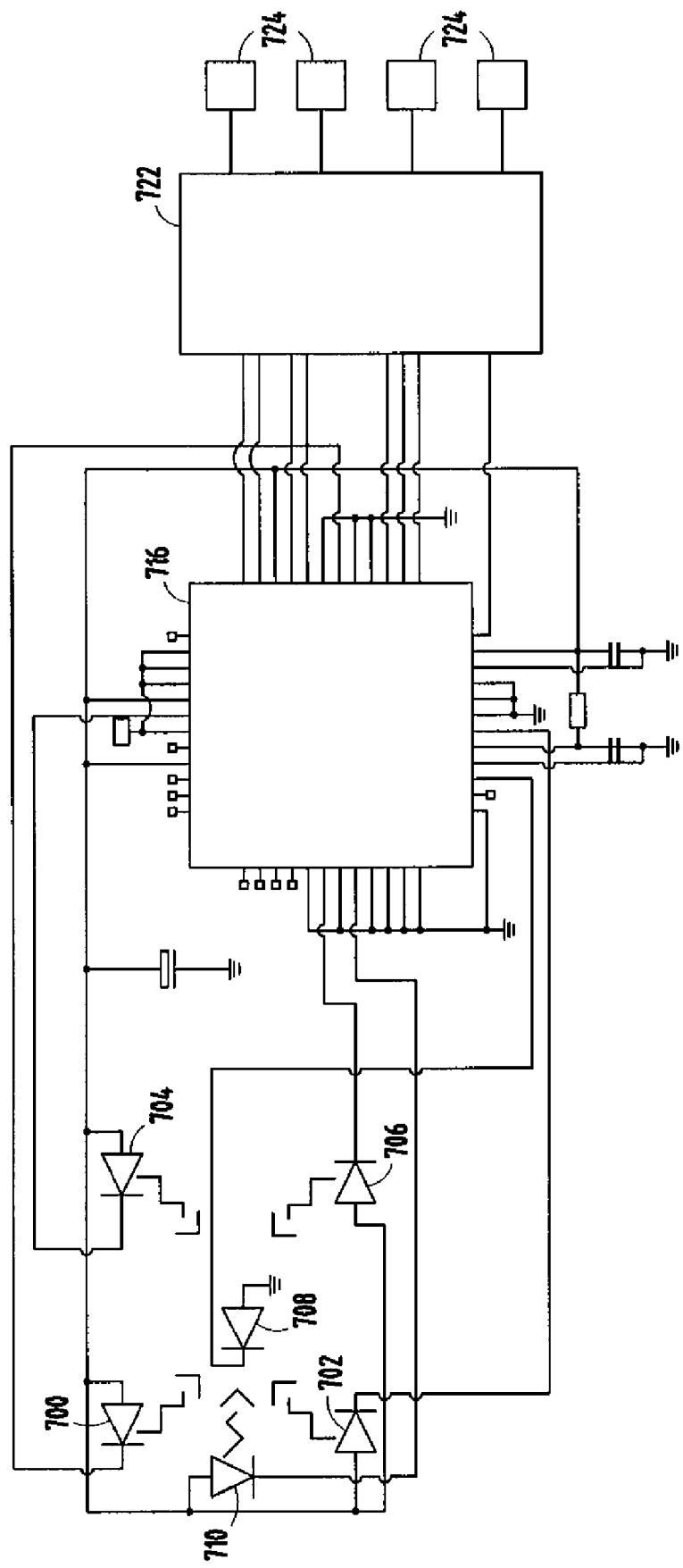
FIG. 16 is a circuit diagram generally illustrating the optical position sensor of FIG. 13, according to another embodiment of the present invention.

The first method, generally illustrated in FIG. 16, utilizes digital I/O ports that are part of sensor processing circuitry 716, and that contain current data representative of the proximity of an object to each of source LEDs 700, 702, 704, and 706. These ports are directly connected to electronic device control circuitry 722. Electronic control device circuitry 722 monitors the values provided by the digital I/O ports and performs calculations using those values to determine the position of an object on translucent surface 701, and the motion of an object on translucent surface 701 over time. Electronic device control circuitry 722 can also use the rate of change of those values over time to determine the velocity and acceleration of objects moving adjacent to or on translucent surface 701. In this manner, electronic device control circuitry 722 can control any number of electronic devices 724 attached to electronic device control circuitry 722 based on calculations performed using sensor data provided by sensor processing circuitry 716.

The second method for providing values indicative of a distance of objects from source LEDs 700, 702, 704, and 706 utilizes SPI control circuitry contained in sensor processing circuitry 716. This embodiment is generally illustrated in FIG. 15. In this method, SPI control signals from sensor processing circuitry 716 are coupled to SPI interface circuitry 720. Electronic device control circuitry 722 sends commands to sensor processing circuitry 716 via SPI interface circuitry 720, requesting data from sensor processing circuitry 716 indicative of the distance of objects from source LEDs 700, 702, 704, and 706. Sensor processing circuitry 716 sends the requested data to electronic device control circuitry 722 via the SPI bus and SPI interface circuitry 720. Electronic device control circuitry 722 then utilizes this data to determine the position, velocity, and acceleration of objects adjacent to or on translucent surface 701.

The third method used to provide data from sensor processing circuitry 716 to electronic device control circuitry 722 utilizes $I^2C$ interface circuitry of sensor processing circuitry 716. This embodiment is also generally illustrated in FIG. 15. As shown in FIG. 15, $I^2C$ I/O lines of sensor processing circuitry 716 are coupled to $I^2C$ interface circuitry 718. Electronic device control circuitry 722 issues commands to, and receives data from, sensor processing circuitry 716 via $I^2C$ interface circuitry 718. By using the $I^2C$ interface, electronic device control circuitry 722 receives values from sensor processing circuitry 716 indicative of the distance of objects adjacent to, or on, translucent surface 701, from source LEDs 700, 702, 704, and 706. Electronic device control circuitry 722 then uses these values to determine the position, velocity, and/or acceleration of objects adjacent to, or on, translucent surface 701. Electronic device control circuitry 722 is shown coupled to multiple electronic devices 724. Electronic device control circuitry 722 utilizes position, velocity, and acceleration data to implement control structures, which are then used to control electronic devices 724.

It should be appreciated that in an alternate embodiment, enhanced optical position sensor 70 could be configured to operate as a basic position sensor by not utilizing time-slicing to switch the various LEDs 700, 702, 704, and 706 on at different times.

Returning to FIG. 10, rearview assembly 10 is shown having a rotary optical sensor area 72 in a translucent surface adjacent to, and in front of, an enhanced optical position sensor 70. Enhanced optical position sensor 70 is implemented as shown in FIG. 15, utilizing an $I^2C$ data bus. In the present embodiment, electronic device control circuitry 722 is configured to operate as rotary volume control circuitry for a vehicle audio system. When a user's hand approaches the surface of rotary optical sensor area 72, electronic device control circuitry 722, which has been monitoring sensor processing circuitry 716 via the $I^2C$ bus, causes a backlight device 724 to illuminate when the hand is within a certain distance of the surface of rotary optical sensor area 72. As shown, rotary optical sensor area 72 has a circle outline of a rotary volume control, which becomes visible when the backlight 724 is turned on. When the user touches the surface of rotary optical sensor area 72 on an area of the circle, electronic device control circuitry 722 determines the position of the circle that has been touched, and communicates that information, via a vehicle bus, to the vehicle's audio system. Based on the signal received from electronic device control circuitry 722, the vehicle audio system causes the volume of the vehicle audio system to attain the level indicated by the area of rotary optical sensor area 72 that has been touched.

It should be appreciated that a user can trace a circular path around rotary optical sensor area 72 with a finger, and that electronic device control circuitry 722 can sense this motion, and communicate, via vehicle bus, to the vehicle audio system to increase or decrease the audio system volume responsive to the motion of the user's finger. In this manner, the function of a typical rotary volume control can be implemented without the use of a mechanical volume control dial. In one alternate embodiment, rotary optical sensor area 72 is configured to operate in a manner similar to a rotary input of an iPod™ electronic device.

In an alternate embodiment, electronic device control circuitry 722 is configured to operate as rotary dimming control circuitry. This alternate embodiment functions in a manner similar to the rotary volume control embodiment disclosed above, with the exception that the brightness of a light-emitting device, rather than the volume of an audio system, is controlled.

Rearview assembly 10 is also shown including a spatial optical sensor area 74 adjacent to, and in front of, enhanced optical position sensor 70. Enhanced optical position sensor 70 operates in the same manner as enhanced optical position sensor 70 discussed above. However, in this embodiment, spatial optical sensor area 74 has a different outline that becomes visible when a user's hand comes into the vicinity of spatial optical sensor area 74. As shown, spatial optical sensor area 74 is used in rearview assembly 10 to control the left-to-right and front-to-rear volume of the speakers 11-14 in vehicle 2 generally illustrated in FIG. 1.

Referring again to FIG. 15, electronic device control circuitry 722, configured in the present embodiment to operate as 2D slider control circuitry, receives signals via an $I^2C$ bus from sensor processing circuitry 716 indicative of the distance of an object from each of source LEDs 700, 702, 704, and 706. Electronic device control circuitry 722 uses this information to determine the position, velocity, and acceleration of an object on or near the surface of spatial optical sensor area 74. Electronic device control circuitry 722 is also configured to determine if an object is in contact with the surface of spatial optical sensor area 74, and how long an object is in contact with the surface of spatial optical sensor area 74. Enhanced optical position sensor 70 is also configured to sense when an object is within a certain distance of enhanced optical position sensor 70. When electronic device control circuitry 722 determines that an object is within a certain distance of spatial optical sensor area 74, electronic device control circuitry 722 causes a backlight 724 in the vicinity of spatial optical sensor area 74 to illuminate the front/rear/left/ right speaker diagram, as shown in FIG. 10. When electronic device control circuitry 722 detects that an object has touched the surface of spatial optical sensor area 74, electronic device control circuitry 722 uses the information provided by sensor processing circuitry 716 to determine where on the surface of spatial optical sensor area 74 the touch has occurred. Based on the location of the contact with spatial optical sensor area 74, electronic device control circuitry 722 adjusts the left/ right balance and/or front-to-rear fade of the audio system of vehicle 2. For example, if electronic device control circuitry 722 determines, based on the information received from sensor processing circuitry 716, that the upper left-hand corner of spatial optical sensor area 74 has been contacted, electronic device control circuitry 722 causes the I/O system 724 of vehicle 2 to increase the audio power provided to the left front speaker, while decreasing the audio power provided to the right front speaker, right rear speaker, and left rear speaker.

It should be appreciated that by touching various areas of the surface of spatial optical sensor area 74, or by moving one's finger along the surface of spatial optical sensor area 74, the audio volume level provided by each of the four speakers of vehicle audio system 724 can be adjusted based on the user input.

It should also be appreciated that in an alternate embodiment, the enhanced optical position sensors 70 associated with rotary optical sensor area 72 and spatial optical sensor area 74 could be implemented using I/O ports of sensor processing circuitry 716, the SPI bus of sensor processing circuitry 716, the I²C bus of sensor processing circuitry 716, or a combination thereof.

In yet another alternate embodiment, an enhanced optical position sensor 70 is used in conjunction with electronic device control circuitry 722 configured to operate as both 2D slider control circuitry and zoom circuitry to control the field of view and zoom function of a camera coupled to a vehicle.

In still another alternate embodiment, an enhanced optical position sensor 70 is used in conjunction with electronic device control circuitry 722 configured to operate as roll detection control circuitry. In this alternate embodiment, electronic device control circuitry 722 is able to detect side-to-side and/or up-down rolling motion of an object such as a finger on the surface of a sensor area adjacent to the enhanced optical position sensor. Electronic device control circuitry 722 then uses the detected rolling motion to control multiple parameters of a vehicle electronics device. In one embodiment, enhanced optical position sensor 70 is located in a rearview assembly in a vehicle, and electronic device control circuitry 722 detects a rolling motion of a finger in contact with the rearview assembly and uses that detected motion to control the left-right and up-down position of a mirror coupled to the vehicle. Electronic device control circuitry 722 is also configured to determine how long a finger has been in contact with the rearview assembly, and uses detected roll information to control a mirror coupled to the vehicle only when a finger has been in contact with the rearview assembly for a predetermined period of time.

Figure 18:
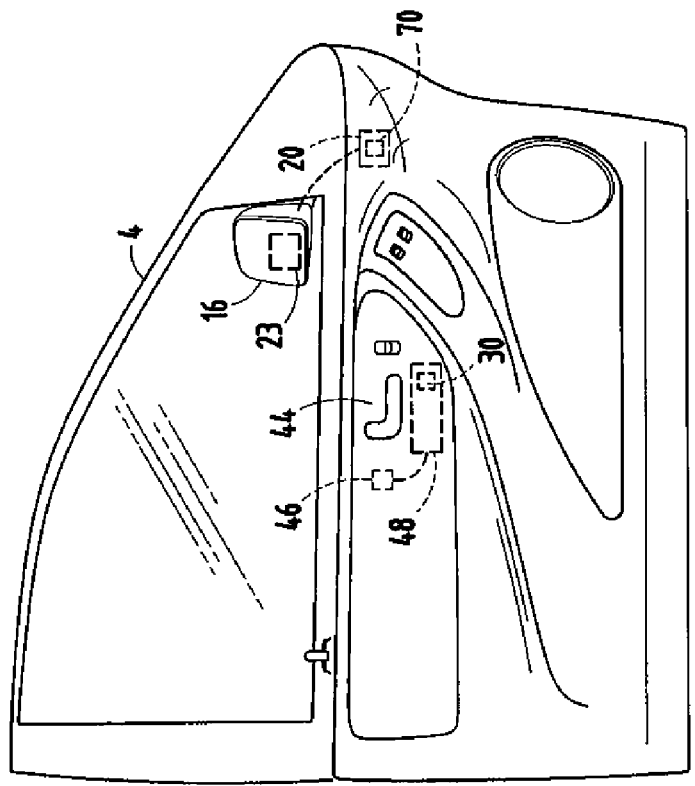
FIG. 18 is a perspective view generally illustrating the inside of the vehicle door of FIG. 17.
Figure 17:
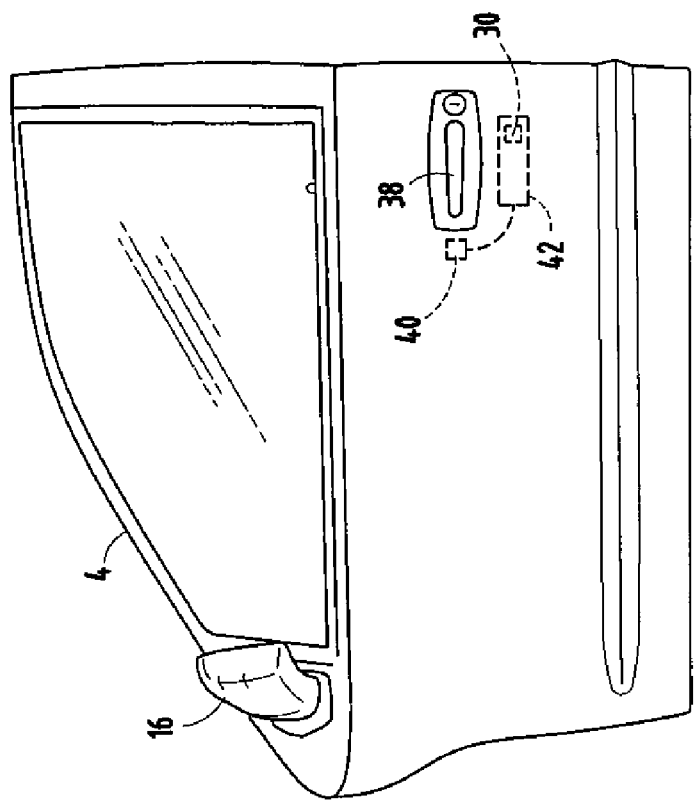
FIG. 17 is perspective view generally illustrating the outside of a vehicle door of the vehicle of FIGS. 1 and 2, according to one embodiment of the present invention.

Referring to FIGS. 17 and 18, a door 4 of vehicle 2 is also shown having an external rearview mirror control 20 for controlling the viewing area of external rearview mirrors 16. As shown, external rearview mirror control 20 is a spatial optical sensor implemented using an enhanced optical position sensor 70, as discussed above with respect to FIG. 15. External rearview mirror control 20 is coupled to a motor 23 for controlling the up-down and left-right position of external rearview mirrors 16 based on user inputs received by the spatial optical sensor. In one embodiment, electronic device control circuitry 722 permits left-right and up-down control of external rearview mirrors 16 only when an object has been in contact with external rearview mirror control 20 for a predetermined period of time. It should be appreciated that in an alternate embodiment, external rearview mirror control 20 could be housed in a rearview assembly, and that electronic device control circuitry 722 could be configured to permit left-right and up-down control of external rearview mirrors 16 only when an object has been in contact with the rearview assembly for a predetermined period of time.

Referring to FIG. 17, a door 4 of vehicle 2 is also shown including an optical sensor area 42 located near an outside door handle 38. A basic optical position sensor 30 is located adjacent to optical sensor area 42, and is coupled to an outside door handle illuminator 40. Basic optical position sensor 30 operates as described above, and acts to control the state of illumination of outside door handle illuminator 40 based on the presence and motion of objects, such as human hands, in the vicinity of optical sensor area 42. In an alternate embodiment, external rearview mirror 16 includes an illumination device (not shown) adjacent to the external rearview mirror. The illumination device is coupled to a basic optical position sensor 30 that is located adjacent to optical sensor area 42. In this alternate embodiment, the state of illumination of the illumination device is controlled based on the presence and/or motion of objects, such as human hands, in the vicinity of optical sensor area 42. It should be appreciated that in this alternate embodiment, optical sensor area 42 and the adjacent basic optical position sensor 30 may be located in exterior areas other than areas in the vicinity of outside door handle 38. It should also be appreciated that optical position sensors other than basic optical position sensor 30, such as, for example, linear optical position sensors 60, and enhanced optical position sensors 70, could be employed to control the state of illumination of the illumination device and/or outside door handle illuminator 40.

Referring to FIG. 18, a door 4 of vehicle 2 is also shown including an optical sensor area 48 located near an inside door handle 44. A basic optical position sensor 30 is located adjacent to optical sensor area 48, and is coupled to an inside door handle illuminator 46. Basic optical position sensor 30 operates as described above, and acts to control the state of illumination of inside door handle illuminator 46 based on the presence and motion of objects, such as human hands, in the vicinity of optical sensor area 48. It should be appreciated that in an alternate embodiment, optical sensor area 48 and the adjacent basic optical position sensor 30 may be located in interior areas other than areas in the vicinity of inside door handle 44. It should also be appreciated that optical position sensors other than basic optical position sensor 30, such as, for example, linear optical position sensors 60, and enhanced optical position sensors 70, could be employed to control the state of illumination inside door handle illuminator 46.

It should be appreciated that in an alternate embodiment of the embodiments described above, multiple basic optical position sensors 30, linear optical position sensors 60, and enhanced optical position sensors 70 can be electrically coupled to a single controller circuit capable of simultaneously providing the sensor control functionality described above in the various embodiments. In other words, one controller circuit could be used to simultaneously implement light control circuitry, backlight control circuitry, rotary volume control circuitry, rotary dimming control circuitry, x-y slider volume control circuitry, 2D slider control circuitry, zoom control circuitry and roll detection control circuitry. In one alternate embodiment employing multiple sensors 30, 60, and 70, each sensor is connected to central controller circuitry. The central controller circuitry is configured to monitor multiple sensors for indications that an object is being detected by the sensors. If the central controller determines that an object is near multiple sensors, the central controller determines which of the multiple sensors the object is closest to, and enables only that sensor to control devices to which it is coupled for a predetermined period of time. In this manner, the inadvertent simultaneous activation of multiple devices controlled by multiple sensors can be avoided. It should also be appreciated that this central controller circuitry, upon detecting which sensor an object is closest to, can activate a backlight for that sensor only, while leaving the backlights for the other sensors turned off.

In yet another alternate embodiment, at least one of sensors 30, 60 and 70 is housed in a rearview assembly and coupled to a vehicle occupant sensing system (not shown). The at least one sensor is configured to provide the vehicle occupant sensing system with the distance of vehicle passengers from the rearview assembly to assist the vehicle occupant sensing system with determining the location of vehicle occupants.

In still another alternate embodiment, at least one of sensors 30, 60 and 70 is located in an audio console 9 of a vehicle 2, and utilized to select from among available audio programs and control audio characteristics, such as volume, balance, fade, bass, and treble, of audio played in vehicle 2.

Although the preferred embodiments are shown utilizing an IC E909.02, commercially available from ELMOS Semiconductor AG, it should be appreciated that in alternate embodiments, the functions provided by sensor processing circuitry 716 can be provided by other circuitry and/or discrete electronic components. In one alternate embodiment, the circuitry and/or discrete electronic components are configured to provide a signal to external circuitry indicative of the position of an object relative to each of source LEDs 700, 702, 704, and 706 over time.

It should be appreciated that the methods and systems described above can be utilized to control electronics devices other than those outlined above, such as, for example, garage door openers, mirror preset modules, and seat preset modules. It should also be appreciated that in alternate embodiments, the LEDs described above in the various embodiments can be radiation emitters other than LEDs, and the photodiodes described above in the various embodiments can be radiation reception elements configured to detect radiation emitted by radiation emitters.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A rearview assembly for a vehicle, said rearview assembly comprising:
    a mounting structure adapted to be mounted to a vehicle, said mounting structure including a housing;
    a rearward viewing device for providing a rearward view to a vehicle occupant; and
    at least one position sensor disposed in said housing, said position sensor including at least;
    a first radiation emitter; a second radiation emitter; sensor processing circuitry coupled said first and second radiation emitters; and
    radiation reception element coupled to said sensor processing circuitry, wherein said radiation reception element is configured to receive light emitted by said first emitter and not reflected by an object, and light emitted by second emitter and reflected by said object,
    thereby adjusting a light intensity of said first radiation emitter based on the received light from said radiation reception element; and
    wherein said at least one position sensor is configured to determine at least one of the distance of said object from said at least one position sensor and the position of said object on the surface of said rearward viewing device by monitoring said light intensity of said first radiation emitter.

2. The rearview assembly of claim 1, wherein said at least one position sensor is further configured to control at least one vehicle electronics device based on at least one of the determined distance and position.

3. The rearview assembly of claim 1, further comprising light control circuitry and a light emitting device, wherein said light control circuitry is coupled to said position sensor and said light emitting device, and wherein said light control circuitry is configured to influence at least one of the amount and hue of light emitted by said light emitting device based on at least one of the determined distance and position.

4. The rearview assembly of claim 3, wherein said light control circuitry is further configured to determine when said object has touched said light emitting device based on at least one of the determined distance and position, and to influence at least one of the amount and hue of light emitted by said light emitting device when said light emitting device is touched.

5. The rearview assembly of claim 4, wherein said light emitting device is a maplight.

6. The rearview assembly of claim 5, further comprising a maplight switch, wherein said light control circuitry is further configured to determine when said object has touched said maplight switch based on at least one of the determined distance and position, and to influence at least one of the amount and hue of light emitted when said maplight switch is touched.

7. The rearview assembly of claim 3, wherein said light emitting device is a light configured to provide illumination in the vicinity of a transmission position indicator.

8. The rearview assembly of claim 3, wherein said light emitting device is a maplight.

9. The rearview assembly of claim 1, further comprising a switch configured to control a vehicle electronics device, a switch backlight configured to provide light for said switch, and backlight control circuitry coupled to said position sensor and said switch backlight and configured to control the amount of light provided by said switch backlight, wherein said backlight control circuitry turns on said switch backlight only when said position sensor determines that said object is within 5 centimeters of said position sensor.

10. The rearview assembly of claim 9, wherein said backlight control circuitry turns off said switch backlight at a predetermined time after determining that said object is not in contact with a surface of said rearward viewing device adjacent to said sensor.

11. The rearview assembly of claim 1, further comprising switch circuitry coupled to said position sensor and at least one vehicle electronics device, wherein said switch circuitry is configured to provide a signal to control the at least one vehicle electronics device based on at least one of the determined distance and position.

12. The rearview assembly of claim 11, wherein said the at least one vehicle electronics device is one of a maplight, electronic compass, garage door opener, mirror preset module and seat preset module.

13. The rearview assembly of claim 1, further comprising rotary volume control circuitry coupled to said position sensor, wherein said rotary volume control circuitry is configured to incrementally alter the volume of a vehicle electronics device based the determined position.

14. The rearview assembly of claim 1, further comprising rotary dimming control circuitry coupled to said position sensor, wherein said rotary dimming control circuitry is configured to incrementally alter the brightness of a light employed in the vehicle based on the determined position.

15. The rearview assembly of claim 1, further comprising x-y slider volume control circuitry coupled to said position sensor, wherein said x-y slider volume control circuitry is configured to incrementally alter the volume of a vehicle electronics device based on the determined position.

16. The rearview assembly of claim 1, further comprising x-y slider dimming control circuitry coupled to said position sensor, wherein said x-y slider dimming control circuitry is configured to incrementally alter the brightness of a light employed in the vehicle based on the determined position.

17. The rearview assembly of claim 1, further comprising 2D slider control circuitry coupled to said at least one position sensor, wherein said 2D slider circuitry is configured to incrementally alter at least two parameters of a vehicle electronics device based on at least one of the determined position and distance.

18. The rearview assembly of claim 17, wherein the two parameters incrementally altered by said 2D slider control circuitry include left-right balance control and front-to-rear fader control for speakers employed in a vehicle.

19. The rearview assembly of claim 17, wherein the two parameters incrementally altered by said 2D slider control circuitry include left-right and up-down control for a mirror coupled to a vehicle.

20. The rearview assembly of claim 19, wherein said 2D slider control circuitry is further configured to determine how long said object has been in contact with said rearward viewing device, and is further configured to permit left-right and up-down control of said mirror only when an object has been in contact with said rearward viewing device for a predetermined amount of time.

21. The rearview assembly of claim 17, wherein the two parameters incrementally altered by said 2D slider circuitry are left-right and up-down field of view control for a camera coupled to a vehicle.

22. The rearview assembly of claim 21, further comprising zoom control circuitry configured to control the zoom function of a camera coupled to said vehicle based on at least one of the determined distance and position.

23. The rearview assembly of claim 1, further comprising finger roll detection control circuitry coupled to said position sensor, wherein said roll detection control circuitry is configured to detect left-right and up-down rolling motion of said object in contact with the surface of said rearward viewing device, and wherein said finger roll detection control circuitry is further configured to incrementally alter at least two parameters of a vehicle electronics device based on the detected left-right and up-down motion.

24. The rearview assembly of claim 23, wherein the two parameters incrementally altered by said finger roll detection control circuitry are left-right and up-down control for a mirror coupled to a vehicle.

25. The rearview assembly of claim 23, wherein said finger roll detection control circuitry is further configured to determine how long an object has been in a certain position in contact with said rearward viewing device, and is further configured to permit left-right and up-down control of a mirror only when said object has been in a certain position in contact with said rearward viewing device for a predetermined amount of time.

26. The rearview assembly of claim 1, further comprising central controller circuitry coupled to multiple position sensors, wherein said central controller circuitry monitors the multiple position sensors to determine when said object is detected by those sensors, and permits only the position sensor closest to said object to actively control a device for a period of time.

27. The rearview assembly of claim 1, further comprising central controller circuitry coupled to multiple position sensors, and a backlight associated with each position sensor configured to provide illumination in the vicinity of each position sensor, and configured to monitor the position sensors, wherein said central controller circuitry monitors the multiple position sensors to determine which position sensor is closest to said object in the vicinity of said rearview assembly, and increases the brightness of the backlight associated with the position sensor to which said object is closest.

28. The rearview assembly of claim 1, wherein said at least one position sensor is configured to provide the determined distance to a multi-sensor vehicle occupant sensing system to assist in the determination of the location of occupants within said vehicle.

29. A position sensing assembly for a vehicle, said position sensing assembly comprising:
a housing configured to contain at least one position sensor and having at least a first surface configured to emit radiation produced by said at least one position sensor, said housing also being configured to attach to a vehicle; and
said at least one position sensor including at least:
a first radiation emitter;
a second radiation emitter; sensor processing circuitry coupled to of said first and second radiation emitters; and
a radiation reception element coupled to said sensor processing circuitry, wherein said radiation reception element is configured to receive light emitted by said first emitter and not reflected by an object, and light emitted by the second emitter and reflected by said object, thereby adjusting a light intensity of said first radiation emitter based on the received light from said radiation reception element;
and wherein said at least one position sensor is configured to determine at least one of the distance of said object from said position sensor and the position of said object on said first surface of said housing by monitoring said light intensity of said first radiation emitter.

30. The position sensing assembly of claim 29, wherein said at least one position sensor is further configured to communicate at least one of the determined distance and position to a vehicle electronics device.

31. The position sensing assembly of claim 29, wherein said at least one position sensor is further configured to communicate at least one of the determined distance and position to a vehicle occupant.

32. The position sensing assembly of claim 29, wherein said at least one position sensor is further configured to control at least one vehicle electronics device based on at least one of the determined distance and position.

33. The position sensing assembly of claim 29, wherein said housing is a housing of a rearview assembly.

34. The position sensing assembly of claim 29, wherein said housing is a housing of an instrument panel.

35. The position sensing assembly of claim 29, wherein said housing is a housing of a floor console.

36. The position sensing assembly of claim 29, wherein said housing is a housing of an overhead console.

37. The position sensing assembly of claim 29, wherein said housing is a housing of a door panel.

38. The position sensing assembly of claim 29, wherein said housing is a housing of an external vehicle component.

39. The position sensing assembly of claim 32, wherein said vehicle electronics device is a maplight.

40. The position sensing assembly of claim 32, wherein said vehicle electronics device is a door latch backlight.

41. The position sensing assembly of claim 32, wherein said vehicle electronics device is an outside mirror.

42. The position sensing assembly of claim 32, wherein said vehicle electronics device is a compass display.

43. The position sensing assembly of claim 32, wherein said vehicle electronics device is a switch backlight.

44. The position sensing assembly of claim 32, wherein said vehicle electronics device is a light configured to provide illumination in the vicinity of a transmission position indicator.

45. The position sensing assembly of claim 32, wherein said vehicle electronics device is garage door opener.

46. The position sensing assembly of claim 32, wherein said vehicle electronics device is a mirror preset module.

47. The position sensing assembly of claim 32, wherein said vehicle electronics device is a seat preset module.

48. The position sensing assembly of claim 32, wherein said vehicle electronics device is a vehicle audio device.

49. The position sensing assembly of claim 32, wherein said vehicle electronics device is camera.

50. The position sensing assembly of claim 32, wherein said vehicle electronics device is a vehicle occupant sensing system.

* * * * *

UNITED STATES PATENT AND TRADEMARK OFFICE
CERTIFICATE OF CORRECTION

PATENT NO. : 7,817,020 B2
APPLICATION NO. : 11/550225
DATED : October 19, 2010
INVENTOR(S) : Robert R. Turnbull et al.

It is certified that error appears in the above-identified patent and that said Letters Patent is hereby corrected as shown below:

Column 1
Line 50, "ordinate" should be --inordinate--.

Column 2
Lines 33-38, "Cup holder" should be --cupholder--.

Column 3
Lines 21 and 22, "Cup holder" should be --cupholder--.

Line 57, "is perspective" should be --is a perspective--.

Column 6
Line 18, "LED with" should be --LED 304 with--.

Column 8
Line 16, After "(SPI)" delete "interface".

Column 11
Lines 53 and 54, "SPI interface protocol" should be --SPI protocol--.

Line 57, "SPI interface logic" should be --SPI logic--.

Lines 58 and 59, "SPI interface logic" should be --SPI logic--.

Line 60, "SPI interface logic" should be --SPI logic--.

Line 64, "SPI interface logic" should be --SPI logic--.

Line 67, "SPI interface logic" should be --SPI logic--.

Signed and Sealed this
Eighth Day of February, 2011

David J. Kappos
*Director of the United States Patent and Trademark Office*

CERTIFICATE OF CORRECTION (continued)
U.S. Pat. No. 7,817,020 B2

Column 12
Line 1, "interface logic" should be --logic--.

Line 2, "SPI interface logic" should be --SPI logic--.

Line 4, "SPI interface logic" should be --SPI logic--.

Line 7, "SPI interface logic" should be --SPI logic--.

Line 24, "SPI interface logic" should be --SPI logic--.

Line 44, "a SPI" should be --an SPI--.

Line 44, "SPI interface logic" should be --SPI logic--.

Column 13
Line 4, "inventor)" should be --inventor,--.

Column 14
Line 4, After "beyond" delete "of".

Line 34, "ends" should be --end--.

Column 15
Line 14, "positions" should be --position--.

Column 17
Line 34, "SPI interface circuitry" should be --SPI circuitry--.

Line 36, "SPI interface circuitry" should be --SPI circuitry--.

Line 41, "SPI interface circuitry" should be --SPI circuitry--.

Column 22
Claim 1, line 4, "at least;" should be --at least:--.

Claim 1, line 6, "coupled said" should be --coupled to said--.

Column 23
Claim 12, line 7, "wherein said the at least" should be --wherein said at least--.

Claim 13, line 15, "based the" should be --based on the--.

Column 24
Claim 29, line 49, "coupled to of said" should be --coupled to said--.